US010782969B2

(12) United States Patent
Doshi et al.

(10) Patent No.: US 10,782,969 B2
(45) Date of Patent: *Sep. 22, 2020

(54) VECTOR CACHE LINE WRITE BACK PROCESSORS, METHODS, SYSTEMS, AND INSTRUCTIONS

(71) Applicant: Intel Corporation, Santa Clara, CA (US)

(72) Inventors: Kshitij A. Doshi, Chandler, AZ (US); Thomas Willhalm, Sandhausen (DE)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/979,223

(22) Filed: May 14, 2018

(65) Prior Publication Data
US 2018/0260325 A1 Sep. 13, 2018

Related U.S. Application Data

(63) Continuation of application No. 14/628,954, filed on Feb. 23, 2015, now Pat. No. 9,971,686.

(51) Int. Cl.
G06F 9/30 (2018.01)
G06F 12/0811 (2016.01)
(Continued)

(52) U.S. Cl.
CPC ...... *G06F 9/30036* (2013.01); *G06F 9/30043* (2013.01); *G06F 12/0811* (2013.01);
(Continued)

(58) Field of Classification Search
CPC ... G06F 9/30036; G06F 12/0804–0844; G06F 9/30043–30047
See application file for complete search history.

(56) References Cited

U.S. PATENT DOCUMENTS 5,835,948 A 11/1998 Olarig et al.
5,966,734 A 10/1999 Mohamed et al.
(Continued)

FOREIGN PATENT DOCUMENTS

JP 10-083351 A 3/1998
JP 2006-185284 A 7/2006
(Continued)

OTHER PUBLICATIONS

Extended European Search Report for Application No. 16756015.0, dated Sep. 24, 2018, 10 pages.
(Continued)

Primary Examiner — Reginald G Bragdon
Assistant Examiner — Curtis James Kortman
(74) Attorney, Agent, or Firm — NDWE, LLP

(57) ABSTRACT

A processor of an aspect includes a plurality of packed data registers, and a decode unit to decode a vector cache line write back instruction. The vector cache line write back instruction is to indicate a source packed memory indices operand that is to include a plurality of memory indices. The processor also includes a cache coherency system coupled with the packed data registers and the decode unit. The cache coherency system, in response to the vector cache line write back instruction, to cause, any dirty cache lines, in any caches in a coherency domain, which are to have stored therein data for any of a plurality of memory addresses that are to be indicated by any of the memory indices of the source packed memory indices operand, to be written back toward one or more memories. Other processors, methods, and systems are also disclosed.

20 Claims, 22 Drawing Sheets

(51) Int. Cl.
 *G06F 12/0815* (2016.01)
 *G06F 12/084* (2016.01)
(52) U.S. Cl.
 CPC ........ *G06F 12/0815* (2013.01); *G06F 12/084* (2013.01); *G06F 2212/452* (2013.01)

(56) References Cited

U.S. PATENT DOCUMENTS

| | | | | |
|---|---|---|---|---|
| 6,546,462 | B1* | 4/2003 | Palanca | G06F 12/0804 711/135 |
| 7,437,597 | B1 | 10/2008 | Kruckemyer et al. | |
| 8,738,860 | B1 | 5/2014 | Griffin et al. | |
| 2003/0084259 | A1* | 5/2003 | Palanca | G06F 9/30047 711/163 |
| 2003/0182539 | A1* | 9/2003 | Kunkel | G06F 9/383 712/225 |
| 2003/0217080 | A1* | 11/2003 | White | G06F 3/061 |
| 2004/0117441 | A1* | 6/2004 | Liu | G06F 12/0888 709/203 |
| 2004/0158681 | A1 | 8/2004 | Hooker | |
| 2005/0188264 | A1 | 8/2005 | Luick et al. | |
| 2006/0123200 | A1 | 6/2006 | Ito et al. | |
| 2007/0143548 | A1 | 6/2007 | Nakanishi et al. | |
| 2008/0263321 | A1* | 10/2008 | Le | G06F 9/3838 712/32 |
| 2009/0276579 | A1* | 11/2009 | Moyer | G06F 12/0804 711/141 |
| 2011/0153952 | A1* | 6/2011 | Dixon | G06F 12/0891 711/135 |
| 2011/0167224 | A1 | 7/2011 | Isono | |
| 2012/0137074 | A1 | 5/2012 | Kim et al. | |
| 2014/0095779 | A1 | 4/2014 | Forsyth et al. | |
| 2014/0281271 | A1 | 9/2014 | Miura et al. | |
| 2014/0281425 | A1 | 9/2014 | Valentine et al. | |
| 2014/0317353 | A1 | 10/2014 | Asher et al. | |
| 2014/0344553 | A1* | 11/2014 | Hughes | G06F 9/3861 712/208 |
| 2015/0032972 | A1 | 1/2015 | Sakthivelu et al. | |
| 2015/0095578 | A1 | 4/2015 | Doshi et al. | |
| 2015/0178202 | A1 | 6/2015 | Sankaran et al. | |
| 2016/0085547 | A1 | 3/2016 | Memon | |
| 2016/0092223 | A1 | 3/2016 | Wang et al. | |

FOREIGN PATENT DOCUMENTS

| | | |
|---|---|---|
| JP | 2011-134318 A | 7/2011 |
| JP | 2012-530979 A | 12/2012 |
| WO | 2014158156 A1 | 10/2014 |
| WO | 2016137618 A1 | 9/2016 |

OTHER PUBLICATIONS

Intel® Architecture Instruction Set Extensions Programming Reference, Oct. 2014, 32 pages.
Intel, "Intel 64 and IA-32 Architectures Software Developer's Manual," Instruction Set Reference, A-Z, Order No. 325383-040US, vol. 2 (2A, 2B & 2C), Oct. 2011, 1721 pages.
Intel, "Intel 64 and IA-32 Architectures Software Developer's Manual," vol. 1: Basic Architecture, Order No. 253665-040US, Oct. 2011, 548 pages.
Intel, "Intel 64 and IA-32 Architectures Software Developer's Manual" vol. 3 (3A, 3B & 3C): System Programming Guide, Order No. 325384-040US, Oct. 2011, 1916 pages.
Intel, "Intel Advanced Vector Extensions Programming Reference," Document reference No. 319433-011, Jun. 2011, 595 pages.
International Preliminary Report on Patentability for Application No. PCT/US2016/014657, dated Sep. 8, 2017, 8 pages.
International Search Report and Written Opinion for Application No. PCT/US2016/014657, dated Jun. 29, 2016, 11 pages.
Non-Final Office Action from U.S. Appl. No. 14/628,954, dated Jan. 13, 2017, 17 pages.
Notice of Allowance from U.S. Appl. No. 14/628,954, dated Dec. 14, 2017, 17 pages.
Office Action and Search Report from foreign counterpart Taiwan Patent Application No. 105101722, dated Dec. 15, 2017, 4 pages. (Translation available only for search report).
Office Action from foreign counterpart Taiwan Patent Application No. 105101722, dated Feb. 17, 2017, 14 pages.
Park J., et al., "Location-Aware Cache Management for Many-Core Processors with Deep Cache Hierarchy," Nov. 17-21, 2013, 12 pages.
Notice of Reasons for Refusal, JP App No. 2017-538592, dated Dec. 24, 2019, 9 pages (5 pages of English Translation and 4 pages of Original Document).
Office Action, JP App No. 2017-538592, dated Jun. 16, 2020, 5 pages (3 pages of English Translation and 2 pages of Original Document).

* cited by examiner

FIG. 7
OPTIONALLY MASKED CACHE LINE WRITE BACK OPERATION 770
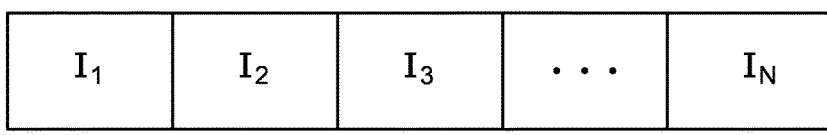
SOURCE PACKED MEMORY INDICES OPERAND 748
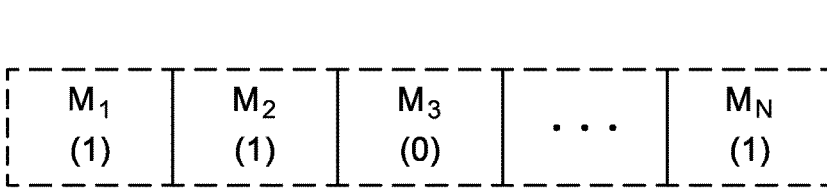
SOURCE PACKED DATA OPERATION MASK (OPTIONAL) 768
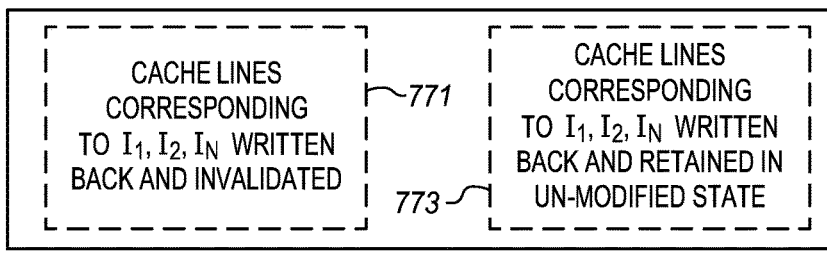
CACHE(S) 740
776 DIRTY CACHE LINE WRITE BACKS
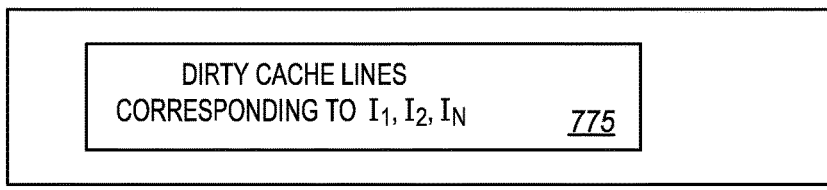
STORE BUFERS OF MEMORY SUBSYSTEM UNIT 748
778 STORES
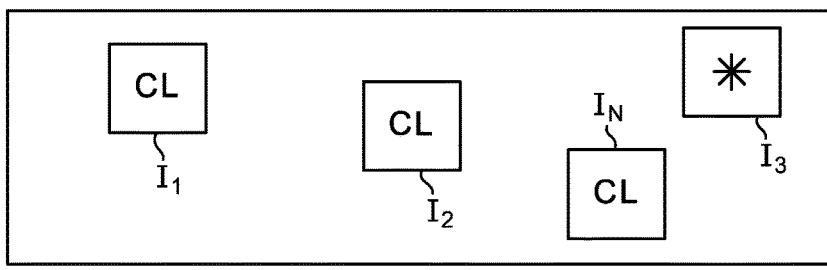
ONE OR MORE MEMORIES / STORAGE DEVICES 724

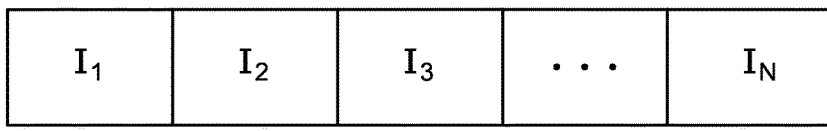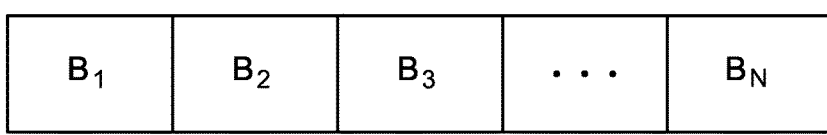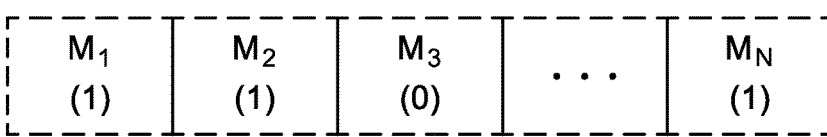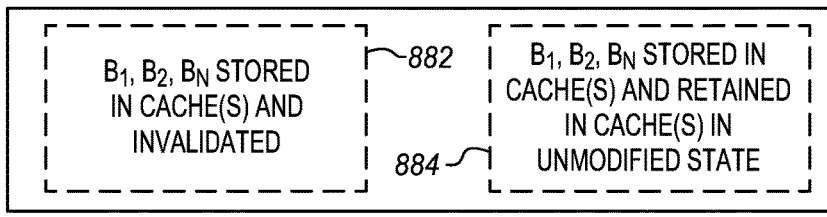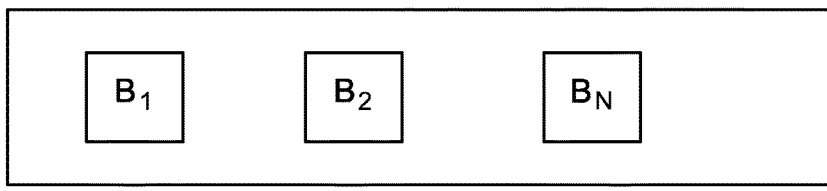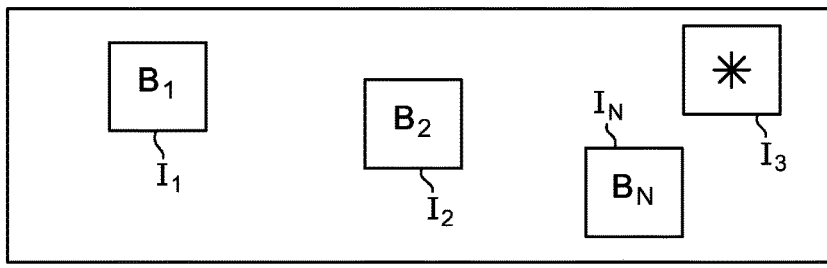
FIG. 8

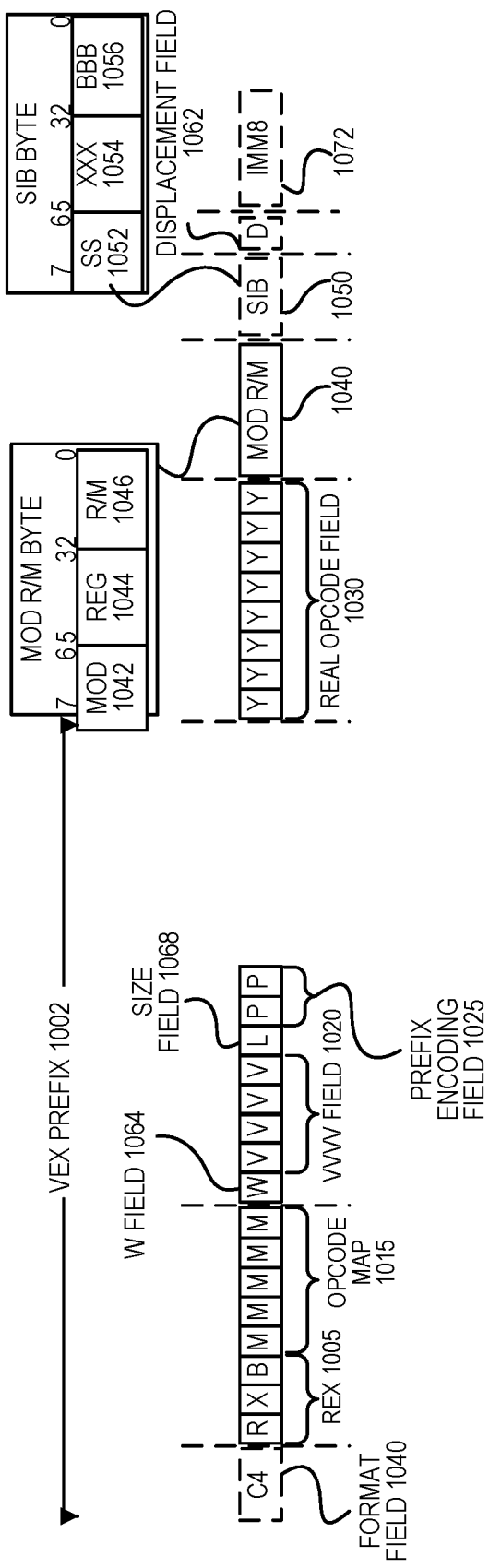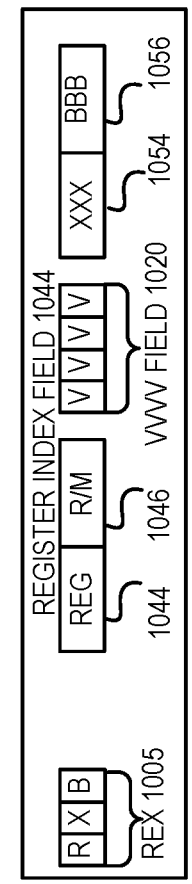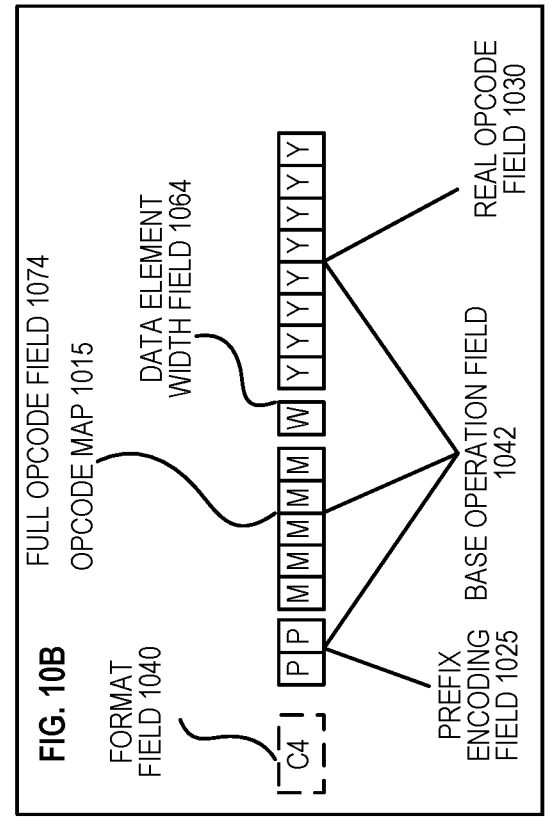

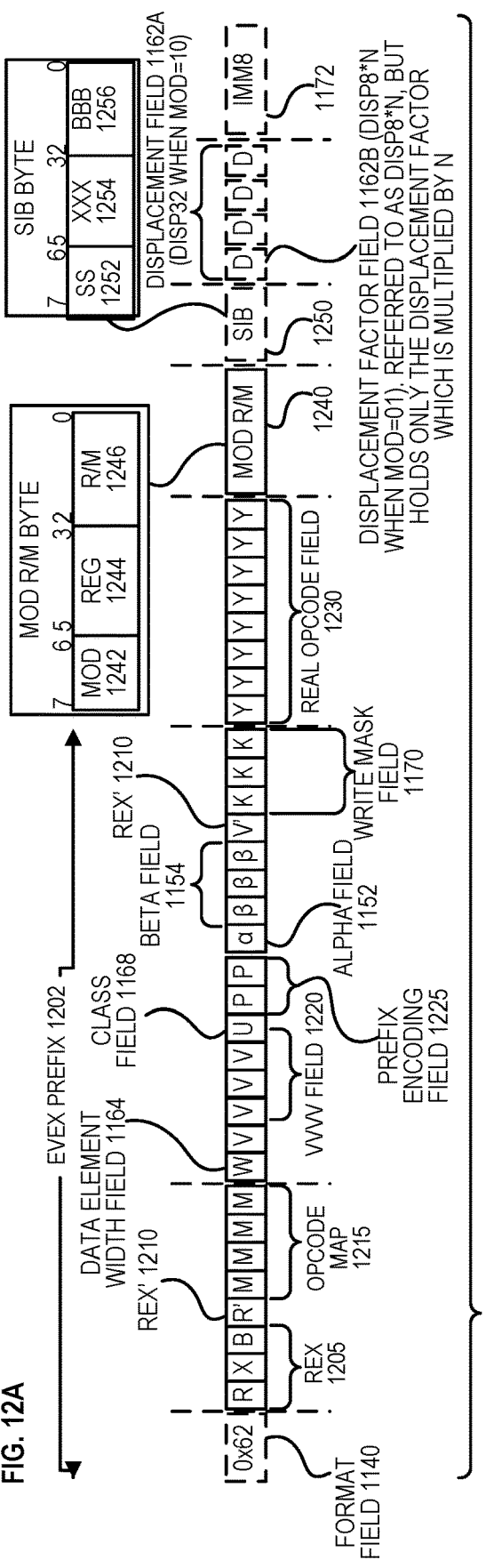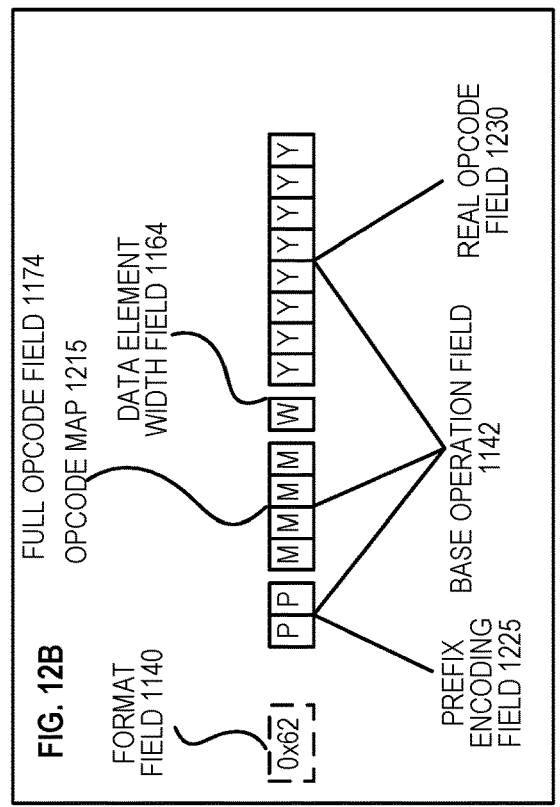
FIG. 12A
FIG. 12B
FIG. 12C

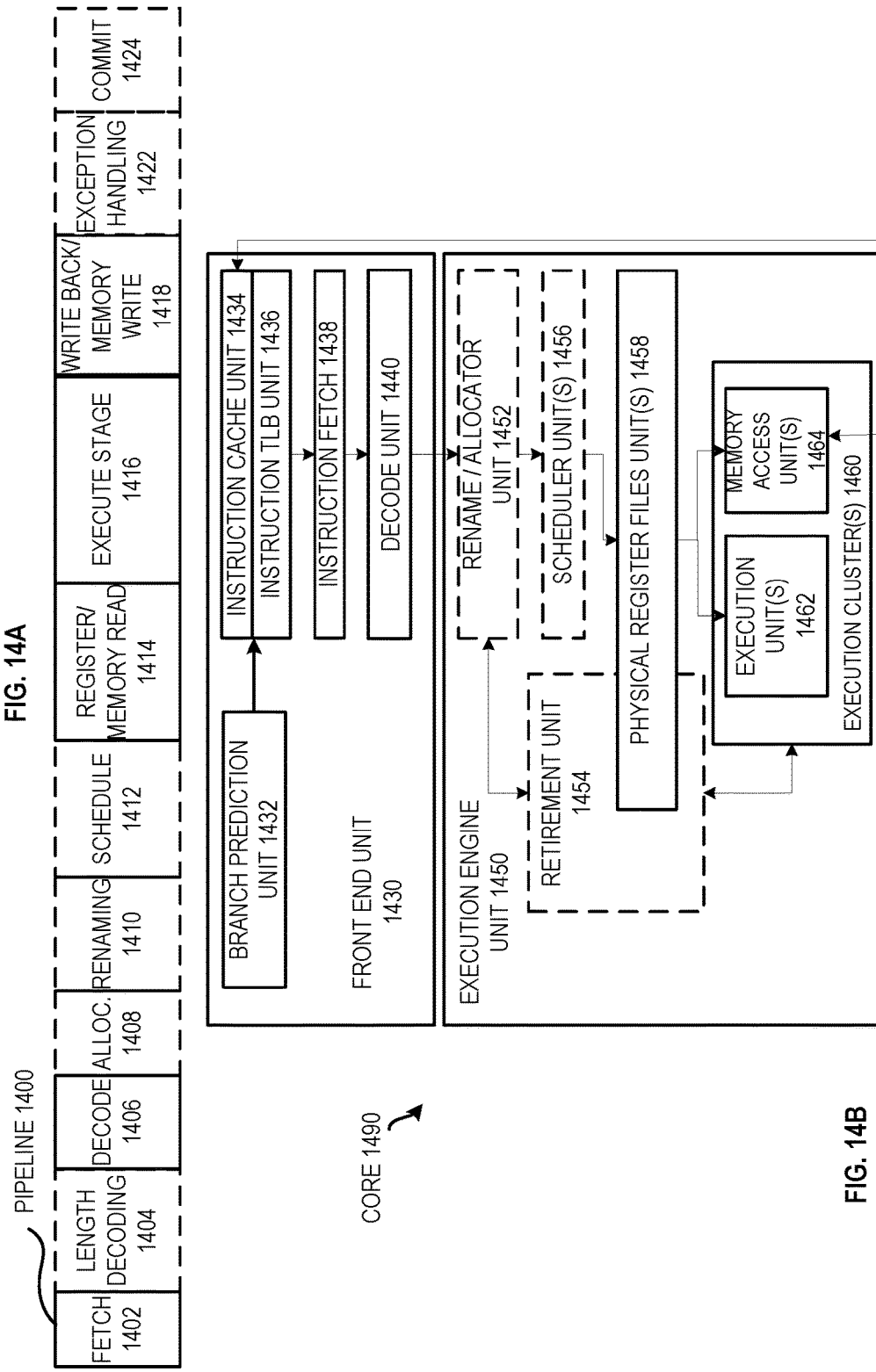
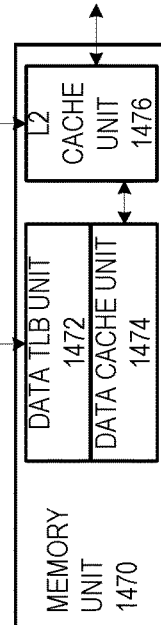
FIG. 14A
FIG. 14B

VECTOR CACHE LINE WRITE BACK PROCESSORS, METHODS, SYSTEMS, AND INSTRUCTIONS

CROSS-REFERENCE TO RELATED APPLICATIONS

This application is a continuation of U.S. patent application Ser. No. 14/628,954, titled "VECTOR CACHE LINE WRITE BACK PROCESSORS, METHODS, SYSTEMS, AND INSTRUCTIONS, filed on Feb. 23, 2015, now U.S. Pat. No. 9,971,686, issued on May 15, 2018. U.S. patent application Ser. No. 14/628,954 is hereby incorporated herein by reference in its entirety.

BACKGROUND

Technical Field

Embodiments described herein generally relate to processors. In particular, embodiments described herein generally relate to caches in processors.

Background Information

In order to improve performance, processors commonly include one or more caches. The caches may represent relatively smaller and faster-access storage than system memory. In addition, the caches may be relatively closer to the cores and/or instruction pipelines than the system memory. The caches may be used to cache or store data that has been brought into the processor from the system memory in order to provide faster subsequent accesses to the data. Representatively, accesses to data in the caches generally take no more than a few processor clock cycles, whereas accesses to data in the system memory may often take from tens to hundreds of clock cycles. When the processor wants to read data from the system memory, the processor may first check to see if a copy of the data is stored in a cache. If the data is found in the cache, then the processor may access the data from the cache, which generally occurs faster than if the data were instead accessed from the system memory. Similarly, when the processor wants to write data to the system memory, the data may often initially first be stored in a cache.

Processors with one or more caches may implement a cache coherency mechanism or protocol to help ensure that data in the caches is coherently managed and written back to memory at appropriate times so that all cores, processors, or other entities in the system coherently view correct and current versions of the data.

BRIEF DESCRIPTION OF THE DRAWINGS

The invention may best be understood by referring to the following description and accompanying drawings that are used to illustrate embodiments. In the drawings:

FIG. 7 is a block diagram illustrating an embodiment of an optionally masked vector cache line write back operation.

FIG. 8 is a block diagram illustrating an embodiment of an optionally masked vector store indexed and cache line write back operation.

FIGS. 10A-10C are block diagrams illustrating a generic vector friendly instruction format and instruction templates thereof, according to embodiments of the invention.

FIG. 12A-D is a block diagram illustrating an exemplary specific vector friendly instruction format and fields thereof, according to embodiments of the invention.

FIG. 14A is a block diagram illustrating an embodiment of an in-order pipeline and an embodiment of a register renaming out-of-order issue/execution pipeline.

FIG. 14B is a block diagram of an embodiment of processor core including a front end unit coupled to an execution engine unit and both coupled to a memory unit.

DETAILED DESCRIPTION OF EMBODIMENTS

Disclosed herein are vector cache line write back instructions, processors to execute the instructions, methods performed by the processors when processing or executing the instructions, and systems incorporating one or more processors to process or execute the instructions. In the following description, numerous specific details are set forth (e.g., specific instruction operations, data formats, processor configurations, microarchitectural details, sequences of operations, etc.). However, embodiments may be practiced without these specific details. In other instances, well-known circuits, structures and techniques have not been shown in detail to avoid obscuring the understanding of the description.

Figure 1:
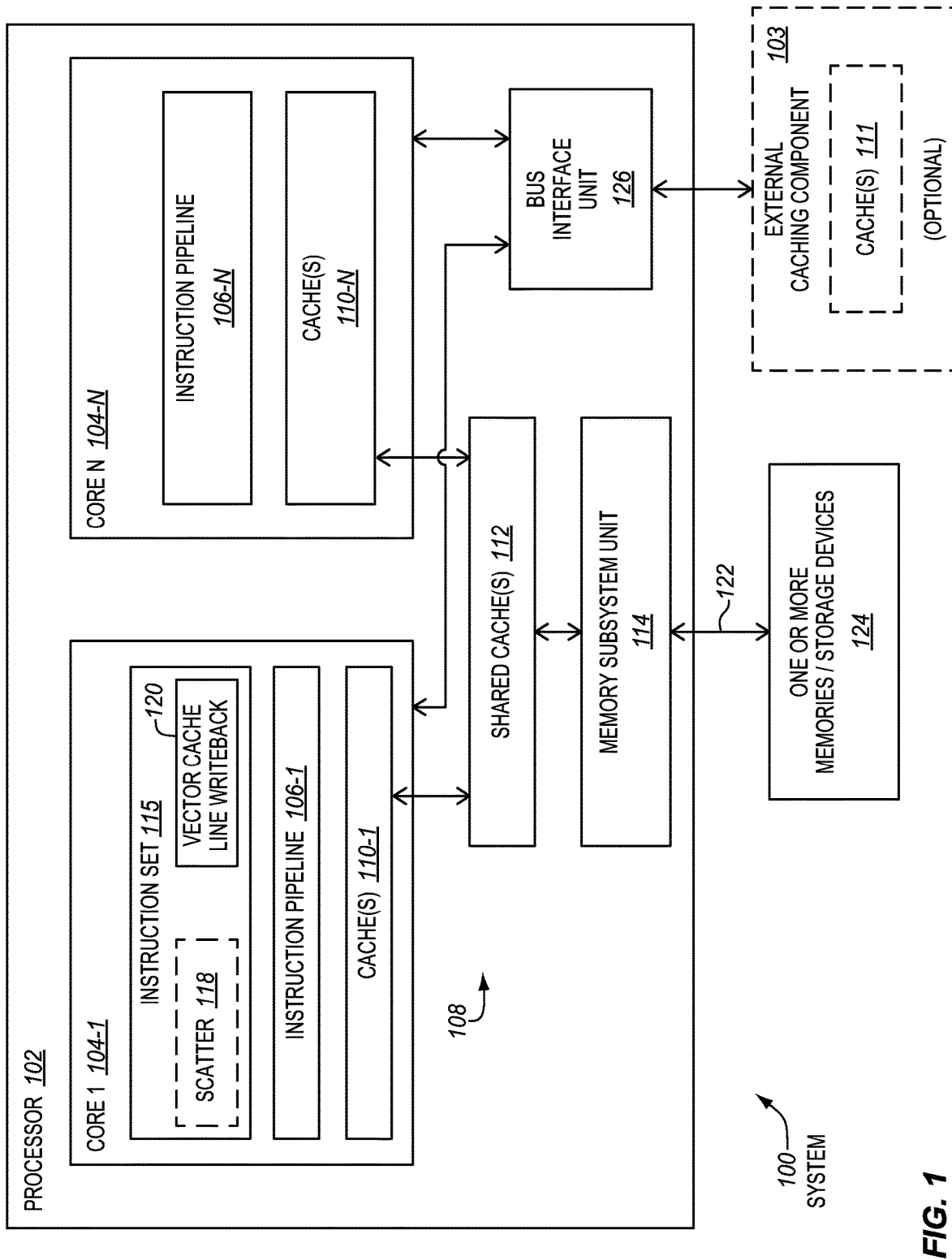
FIG. 1 is a block diagram of an embodiment of a system that is suitable for implementing embodiments, which includes a processor and a set of one or more memories and/or storage devices.

FIG. 1 is a block diagram of an embodiment of a system 100 (e.g., a computer system or other electronic device) that includes a processor 102 and a one or more memories and/or storage devices 124. The processor may include one or more cores 104. As shown, in the illustrated example, the processor optionally includes a first core (core 1) 104-1 through an Nth core (core N) 104-N, where the number of cores N may represent any desired number of cores. Typically, the number of cores ranges from one to on the order of hundreds, often from one to on the order of tens.

Each of the cores includes an instruction pipeline 106. For example, core 1 includes a first instruction pipeline 106-1 and core N includes an Nth instruction pipeline 106-N. Each of the instruction pipelines is capable of processing instructions of an instruction set. The instruction set includes the native instructions that the core and/or the processor is operative to execute. The instructions of the instruction set represent macroinstructions, assembly language instructions, or machine-level instructions that are provided to the processor for execution. As shown, in some embodiments, an instruction set 115 of at least one core (e.g., in this case core 1 104-1) may optionally include a vector store indexed instruction or scatter instruction 118. As further shown, in some embodiments, an instruction set of at least one core (e.g., in this case core 1 104-1) may optionally an embodiment of a vector cache line write back instruction 120. Of course, the instruction set may include other instructions (e.g., scalar load instructions, scalar store instructions, scalar and packed arithmetic instructions, etc.). Commonly, the instruction pipelines may include fetch units to fetch the instructions, decoders to decode the instructions, and execution units or logic to execute the decoded instructions. In the case of an optional out-of-order core, the instruction pipeline may also optionally include allocation, renaming, scheduling, and commit units, logic, or pipeline stages, although this is not required. The scope of the invention is not limited to any specific type of instruction pipeline.

The processor may include one or more caches 110, 112. As shown, the illustrated processor optionally has a cache hierarchy 108 that includes multiple caches at different cache levels. The cache levels differ in their relative closeness to the cores and/or instruction pipelines. Specifically, core 1 has one or more dedicated cache(s) 110-1 at one or more levels. Similarly, core N has one or more dedicated cache(s) 110-N at one or more levels. Each of the one or more dedicated cache(s) 110 is dedicated to the corresponding core that uses and/or includes it. Commonly, each of the sets of one or more dedicated cache(s) 110 may include a first level or level 1 (L1) cache. The L1 caches may represent the cache level that is closest to the instruction pipelines (e.g., the execution units). In some cases, each of the sets of one or more dedicated cache(s) 110 may also optionally/potentially include a second level or level 2 (L2) cache, although this is not required. The L2 caches may represent the next closest cache level to the instruction pipelines (e.g., the execution units).

As shown, the processor may also optionally have one or more shared cache(s) 112 at one or more levels. The one or more shared cache(s) may be shared by (e.g., cache data for) each of the cores, as opposed to being dedicated to any one particular core. By way of example, if the one or more dedicated caches 110 include only a single level of cache or L1 cache, then the one or more shared cache(s) 112 may include a shared L2 cache and optionally/potentially a shared third level or level 3 (L3) cache, although this is not required. Or, if the one or more dedicated caches 110 include both L1 and L2 caches, then the one or more shared caches 112 may include a shared L3 cache and optionally/potentially a shared fourth level or level 4 (L4) cache, although this is not required. These are just a few illustrative examples. Broadly, in various embodiments, the processor may have one or more dedicated or shared caches at one or more cache levels.

The processor may implement a cache coherency mechanism or protocol to help ensure that data stored in the one or more caches 110, 112 of the processor is coherently managed and stored to the memories/storage devices at appropriate times so that all pertinent entities in the system coherently view correct and current versions of the data. For example, the cache coherency mechanism may help to ensure that all cores coherently see correct versions of the data, and that an optional additional (e.g., external) caching component 103 having one or more caches 111 in the same coherency domain as the cache(s) 110, 112 of the processor 102, coherently sees correct versions of the data. By way of example, the additional caching component may include one or more additional processors each with a different cache hierarchy, an input/output device with a cache in the coherency domain, or the like. The external caching component 103 may be coupled with a bus interface unit 126 of the processor 102, such as, for example, through a point-to-point interconnect, a multi-drop bus, or the like. Examples of suitable cache coherency protocols include, but are not limited to, MESI, MOSI, MOESI, and the like. The MESI protocol includes four states, namely modified (M), exclusive (E), shared (S), and invalid (I), which are indicated by two MESI bits. The MOSI protocol utilizes the owned (O) state in place of the exclusive (E) state. The MOESI protocol utilizes both the exclusive (E) and owned (O) states. The modified state designates a dirty cache line.

Referring again to FIG. 1, the processor 102 and the one or more memories and/or storage devices 124 are coupled through an intervening coupling mechanism 122. The processor includes a memory subsystem unit 114 capable of coupling the processor with the memories/storage devices through the intervening coupling mechanism. The coupling mechanism is to be interpreted broadly to include various different types of coupling mechanisms to couple a processor with a memories/storage devices. In various embodiments, the coupling mechanism 122 may include one or more interconnects, one or more memory controllers, one or more components of a chipset, or the like, and various combinations thereof. For example, in some embodiments, the processor may have internal memory controllers and may be directly coupled with the memories/storage devices (or a portion thereof) through an intervening bus or interconnect. As another example, the processor and the memories/storage devices (or a portion thereof) may be coupled with one another through an intervening chipset component (e.g., a memory controller hub) and a set of interconnects.

To further illustrate certain concepts, consider performance of the optional vector store indexed instruction or scatter instruction 118. The scatter instruction may indicate a first source packed data operand (e.g., in a first packed data register of the processor which is not shown) having a plurality of packed data elements and may indicate a second source packed memory indices operand (e.g., in a first packed data register of the processor which is not shown) having a plurality of packed memory indices. The scatter instruction may be operative to cause the executing core (e.g., core 1) to scatter, write, or store each of the data elements of the first source packed data operand to a different corresponding memory location in the memories/storage devices 124 indicated by a corresponding memory index of the second source packed memory indices operand. Depending upon the particular flexible values of the memory indices, the memory locations may potentially/optionally be non-contiguous memory locations. Initially, however, the scattered data elements may be stored in the one or more caches 110, 112 of the processor. Later, at appropriate times (e.g., based on cache coherency protocol), the data elements of the scatter instruction may be written back from the one or more caches 110, 112 to the memories/storage devices 124. Depending again upon the particular flexible values of the memory indices, the memory locations may potentially/optionally correspond to non-sequential cache lines in the memories/storage devices. Such scatter instructions are useful for various different purposes, such as, for example, for updating data in different rows or columns of a table or other data structure, updating data in sparse arrays or data structures, sparse linear algebra operations, etc. The scatter instruction is optional not required.

In some embodiments, the vector cache line write back instruction 120 may be used in conjunction with the optional scatter instruction 118 to write back the data elements of the scatter instruction from the caches 110, 112 toward the memories/storage devices, although the scope of the invention is not so limited. As mentioned above, the data associated with a scatter instruction may initially be stored in the cache(s) of the processor, instead of in the memories/storage devices. The vector cache line write back instruction may indicate a source packed memory indices operand having a plurality of packed memory indices. When used to write back the data of a scatter instruction, the vector cache line write back instruction may use the same memory indices as the scatter instruction (e.g., may indicate the same already generated packed memory indices operand). The vector cache line write back instruction may be performed by the processor 102 to write back toward the memories/storage devices 124 any dirty cache lines, in any caches at any cache levels of the processor (e.g., the caches 110, 112) in a coherency domain, which store data for any of a set of memory addresses indicated by any of the memory indices of the source packed memory indices operand. In some embodiments, the vector cache line write back instruction may also cause a signal to be broadcast, transmitted, or otherwise provided on a bus or interconnect to other entities or components that have one or more caches in the same coherency domain (e.g., the external caching component 103) to cause write back of any dirty cache lines storing or implicated by the memory addresses in those caches as well.

In some embodiments, the data that is written back may optionally be invalidated in the one or more caches. In addition, cache lines storing data for memory addresses indicated by the memory indices of the source packed memory indices operand may be invalidated whether or not they are dirty (e.g., if they are clean, un-modified, shared, exclusive, etc.). Alternatively, in other embodiments, the data that is written back may optionally be retained in the caches and placed in an un-modified state. In some embodiments, a plurality of data elements (e.g., up to a vector's worth if they are all dirty) may be written back, instead of just one single data element, responsive to the vector cache line write back instruction. As with the scatter instruction, again depending upon the flexible values of the memory indices, the memory addresses corresponding to the vector cache line write back instruction may potentially/optionally represent non-contiguous memory addresses and/or may potentially/optionally correspond to non-sequential cache lines in the memories/storage devices.

The vector cache line write back instruction 120 also has utility separate from the scatter instruction 118 and/or when the instruction set 115 optionally omits the scatter instruction 118. For example, the vector cache line write back instruction may optionally be used to write back dirty cache lines corresponding to (e.g., storing data for) a plurality of memory addresses which were previously written to by a plurality of separate scalar store or write to memory instructions. As another example, the vector cache line write back instruction may optionally be used to write back a plurality of dirty cache lines regardless of how the modifications were made to the cache lines (e.g., at the discretion of the software programmer).

Figure 2A:
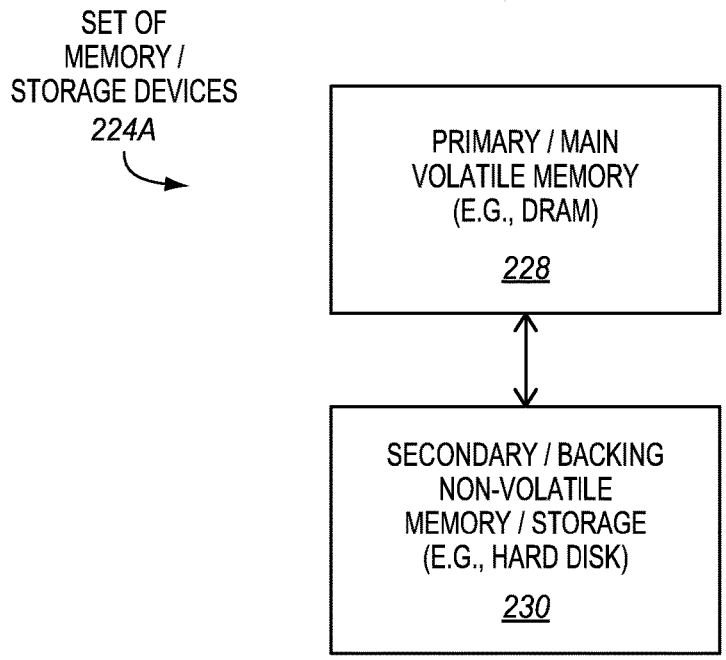
FIG. 2A is a block diagram of a first embodiment of a set of one or more memories and/or storage devices.
Figure 2B:
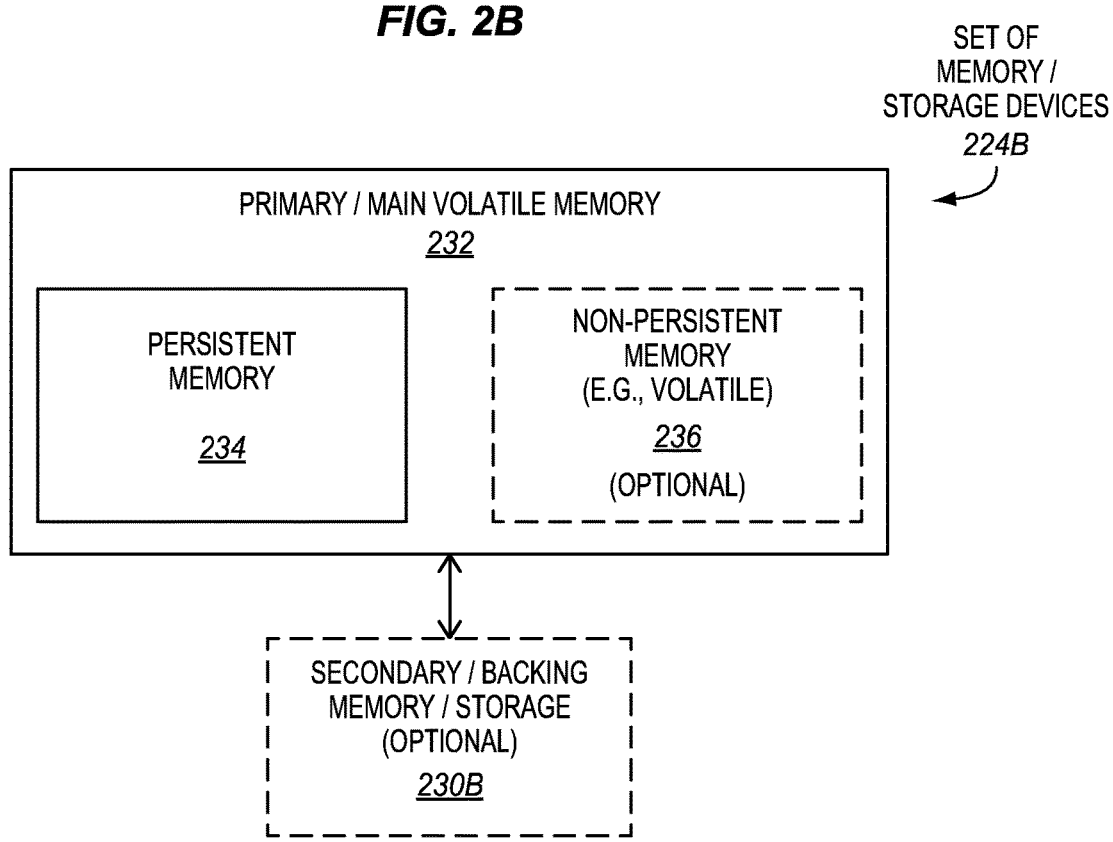
FIG. 2B is a block diagram of a second embodiment of a set of one or more memories and/or storage devices.

Different ways of implementing a set of one or more memories and/or storage devices 124 are contemplated. FIGS. 2A-B show two different suitable embodiments for implementing a set of one or more memories and/or storage devices 124 either with or without persistent memory. Other embodiments will be apparent to those skilled in the art and having the benefit of the present disclosure.

FIG. 2A is a block diagram of a first embodiment of a set of one or more memories and/or storage devices 224A. The memories/storage devices 224A includes a primary or main volatile memory 228 and a secondary or backing non-volatile memory or storage 230. The volatile memory loses its data or contents when power is not applied. In contrast, the non-volatile memory or storage is able to retain its data or contents when power is not applied even for relatively long periods of time. One example type of volatile memory commonly used in computer systems is dynamic random access memory (DRAM). Two example types of non-volatile memory or storage commonly used in computer systems are magnetic disks and flash memory. Historically, DRAM and other types of volatile memory have been significantly faster, in terms of both latency and bandwidth, than magnetic disks and certain other types of non-volatile memory or storage used for secondary or backing storage. However, DRAM and other types of volatile memory generally have also had a higher cost per bit, and correspondingly a lower capacity, than magnetic disks and certain other types of non-volatile mass storage. In such a configuration, the primary or main volatile memory has often been more directly or closely coupled to the processor (e.g., through a memory bus), and has been directly accessible through load and/or store instructions of the processors instruction set. Conversely, the secondary or backing non-volatile memory or mass storage has often been coupled with the processor through an input/output (I/O) controller (e.g., SCSI, SATA, PCI-Express, etc.), and has been accessed through file system application programming interfaces (APIs) via operating system (OS) calls but not ordinarily through load/store instructions of the instruction set.

FIG. 2B is a block diagram of a second embodiment of a set of one or more memories and/or storage devices 224B. The memories/storage devices 224 includes a primary or main memory 232 and an optional set of one or more secondary or backing memories and/or storage devices. The primary/main memory 232 includes so-called persistent memory 234 and optionally/potentially includes non-persistent (e.g., volatile) memory 236. The secondary/backing memory/storage may back the non-persistent (e.g., volatile) memory 236 and/or the persistent memory 234. By way of example, the secondary/backing memory/storage may represent backing flash memory or Non-Volatile Dual hi-line Memory Module (NVDIMM). NVDIMM may represent a computer memory DRAM DIMM that may retain data even when electrical power is removed, for example due to an unexpected power loss, system crash, or a normal system shutdown.

Persistent memory is sometimes referred to as storage class memory (SCM). In various embodiments, the persistent memory may be implemented with non-volatile memory or storage, battery-backed volatile memory, or a combination thereof. Unlike DRAM and other types of volatile memory used for main or primary memory, persistent memory may be used to store data persistently or durably so that it is not lost during power failures and/or system failures and restarts. Once the data is stored in the persistent memory, it is typically retained even if there is a loss of power, operating system failure, system crash, or the like. In some cases, the data may not be lost even in a processor or computer system hardware failure, since it may still be possible to recover the data in the persistent memory if it is not damaged. Such durability or persistency of the data tends to be very valuable for certain applications and/or implementations (e.g., database applications, transactions, etc.).

Persistent memory may be byte-addressable, as opposed to needing page/block addressability, which may help to allow it to be directly coupled with the processor memory bus. In some embodiments, the persistent memory 234 either alone, or in combination with the non-persistent (e.g., volatile) memory 236, may be used to implement the primary or main memory of a computer system. In some embodiments, the persistent memory either alone, or in combination with the non-persistent memory, may be part of the processors addressable physical address space. System software and applications may be able to access the persistent memory by performing user-level instructions (e.g., load instructions, store instructions, scatter instructions, etc.). Accesses to the persistent memory may be subject to generally the same processor memory model (e.g., with respect to cacheability, coherency, processor memory ordering, memory types, etc.) as accesses to DRAM main/primary memory.

Different types of persistent memory 234 are suitable. Examples of suitable types of persistent memory include, but are not limited to, those based on phase change memory (PCM), those based on memristors (e.g., non-linear passive two-terminal electrical components relating electric charge and magnetic flux linkage), and those based on spin-transfer torque (e.g., that utilize an effect in which the orientation of a magnetic layer in a magnetic tunnel junction or spin valve can be modified using a spin-polarized current), to name just a few examples. Other technologies developed in the future, which are either extensions or improvements of these technologies, or different technologies entirely, are also potentially suitable. The scope of the invention is not limited to any particular type of persistent memory. Moreover, embodiments may also be used without persistent memory (e.g., may be used in a DRAM main memory and hard disk secondary memory configuration).

Ensuring that data is stored persistently or durably in the persistent memory 234 may tend to pose additional challenges to software. For one thing, processors (e.g., the processor 102) may have various intermediate volatile microarchitectural structures or components in which data associated with store instructions, scatter instructions, and the like, may be temporarily stored in on its way to the persistent memory. Examples of such volatile structures or components include, but are not limited to, one or more coherency caches (e.g., the caches 110, 112), processor store buffers, write-back buffers, fill-buffers, uncore and/or interconnect queues or buffers, memory controller write pending buffers, memory-side caches, etc. However, these structures or components are volatile and generally would lose their data contents in the event of a power failure, system crash, or the like. The data associated with the store instruction or scatter instruction would not generally become persistent or durable until it is actually stored in the persistent memory or in an intermediate power-fail protected storage device or buffer. As a result, if the power failure, system crash, or the like occurs while the data is stored in one of the volatile structures or components, the data may be lost, and the desired persistency or durability will not have been achieved. In some embodiments, the vector cache line write back instructions disclosed herein may be used to help write back any implicated dirty cache lines out of the cache coherency domain toward persistent memory in order to help achieve persistency or durability of data. In some embodiments, an additional persistent commit instruction may also optionally be used to help ensure the written back data is stored persistently or durably. Alternatively, as will be described further below, a vector cache line write back instruction may optionally incorporate such persistent commit capabilities.

Figure 3:
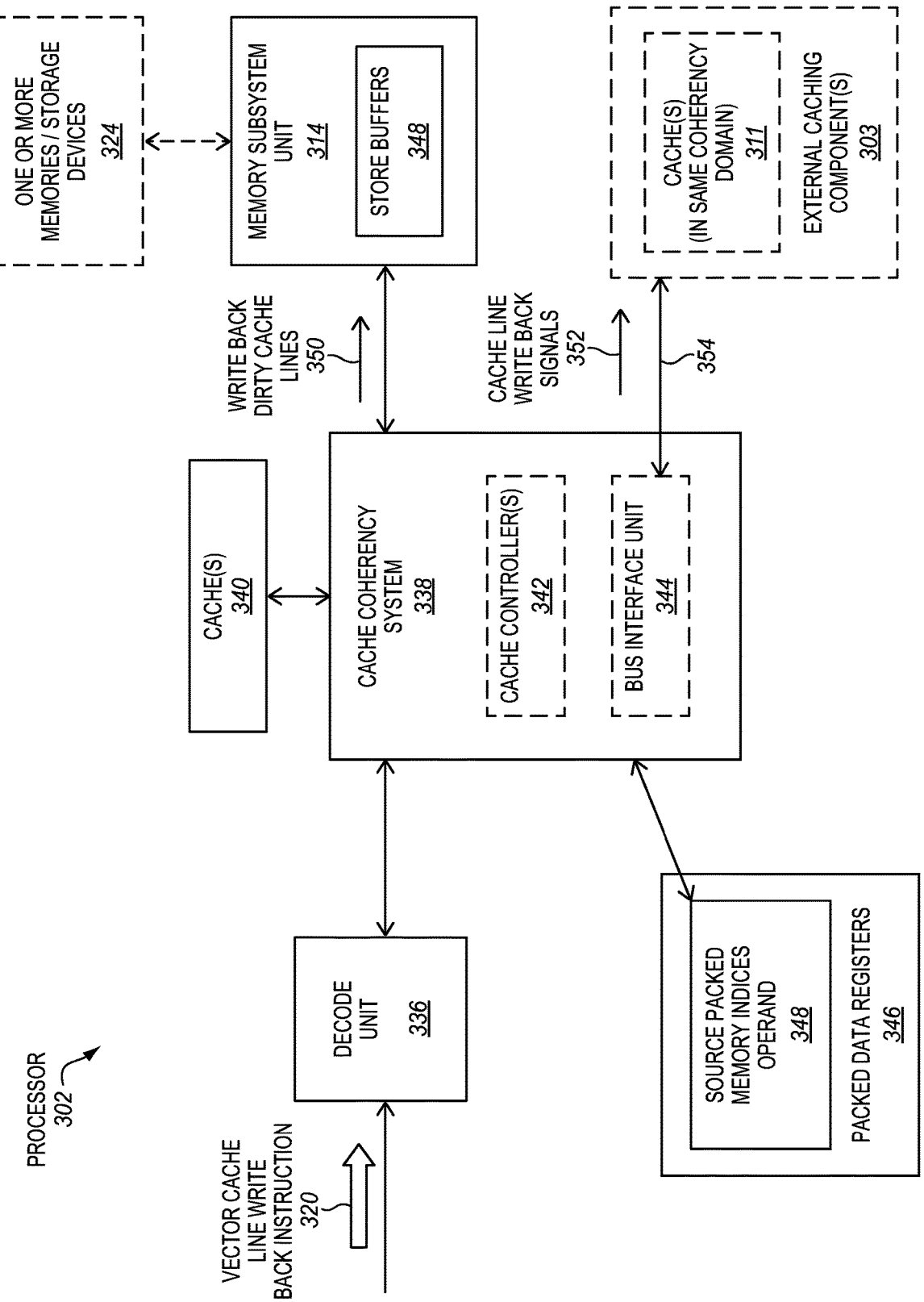
FIG. 3 is a block diagram of an embodiment of a processor that is operative to perform an embodiment of a vector cache line write back instruction.

FIG. 3 is a block diagram of an embodiment of a processor 302 that is operative to perform an embodiment of a vector cache line write back instruction 320. In some embodiments, the processor may be a general-purpose processor (e.g., a general-purpose microprocessor or central processing unit (CPU) of the type used in desktop, laptop, or other computers). Alternatively, the processor may be a special-purpose processor. Examples of suitable special-purpose processors include, but are not limited to, network processors, communications processors, cryptographic processors, graphics processors, co-processors, embedded processors, digital signal processors (DSPs), and controllers (e.g., microcontrollers). The processor may have any of various complex instruction set computing (CISC) architectures, reduced instruction set computing (RISC) architectures, very long instruction word (VLIW) architectures, hybrid architectures, other types of architectures, or have a combination of different architectures (e.g., different cores may have different architectures).

During operation, the processor 302 may receive the vector cache line write back instruction 320. For example, the instruction may be received from one or more memories and/or storage devices 324 over a bus or other interconnect. The instruction may represent a macroinstruction, assembly language instruction, machine code instruction, or other instruction or control signal of an instruction set of the processor. In some embodiments, the vector cache line write back instruction may explicitly specify (e.g., through one or more fields or a set of bits), or otherwise indicate (e.g., implicitly indicate), a source packed memory indices operand 348 having a plurality of packed memory indices. As one example, the instruction may have a source packed memory indices operand specification field or set of bits to specify a packed data register in packed data registers 346, or other storage location, that is used to store the source packed memory indices. Alternatively, a packed data register or other storage location used to store the source packed memory indices operand may optionally be implicit to the instruction (e.g., implicit to an opcode of the instruction).

The processor includes a decode unit or decoder 336. The decode unit may receive and decode the vector cache line write back instruction. The decode unit may output one or more relatively lower-level instructions or control signals (e.g., one or more microinstructions, micro-operations, micro-code entry points, decoded instructions or control signals, etc.), which reflect, represent, and/or are derived from the relatively higher-level vector cache line write back instruction. In some embodiments, the decode unit may include one or more input structures (e.g., port(s), interconnect(s), an interface) to receive the instruction, an instruction recognition and decode logic coupled therewith to recognize and decode the instruction, and one or more output structures (e.g., port(s), interconnect(s), an interface) coupled therewith to output the lower-level instruction(s) or control signal(s). The decode unit may be implemented using various different mechanisms including, but not limited to, microcode read only memories (ROMs), look-up tables, hardware implementations, programmable logic arrays (PLAs), and other mechanisms used to implement decode units.

The processor 302 also includes a set of packed data registers 346. In some embodiments, the source packed memory indices operand 348 may optionally be stored in a packed data register in the set of packed data registers. Alternatively, another storage location may optionally be used for the source packed memory indices operand. Each of the packed data registers may represent an on-die storage location that is operative to store packed data, vector data, or Single instruction, multiple data (SIMD) data. The packed data registers may represent architecturally-visible or architectural registers that are visible to software and/or a programmer and/or are the registers indicated by instructions of the instruction set of the processor to identify operands. These architectural registers are contrasted to other non-architectural registers in a given microarchitecture (e.g., temporary registers, reorder buffers, retirement registers, etc.). The packed data registers may be implemented in different ways in different microarchitectures using suitable techniques and are not limited to any particular type of design. Examples of suitable types of registers include, but are not limited to, dedicated physical registers, dynamically allocated physical registers using register renaming, and combinations thereof.

The processor also includes one or more caches 340 at one or more cache levels. These caches may be in a cache coherency domain. One or more corresponding cache controllers 342 may be operative to control their corresponding caches 340 and may be used to help implement a cache coherency mechanism or protocol. Examples of suitable cache coherency protocols include, but are not limited to, MESI, MOSI, MOESI, and the like. The MESI protocol includes four states, namely modified (M), exclusive (E), shared (S), and invalid (I), which are represented by two MESI bits. The MOSI protocol utilizes the owned (O) state in place of the exclusive (E) state. The MOESI protocol utilizes both the exclusive (E) and owned (O) states. Optionally, the processor 302 may be coupled with one or more other optional processors 303, or other entities, which have one or more caches 311 that are also in the same cache coherency domain. The one or more optional other processors 303, or other entities, may be coupled with the processor 302 by a bus, interconnect, or other coupling mechanism 354.

The processor also includes a cache coherency system 338 that is operative to perform or implement the vector cache line write instruction. The cache coherency system may also be regarded as a vector cache line write back unit or logic and/or execution logic. The cache coherency system is coupled with an output of the decode unit 336 and the packed data registers 346. The cache coherency system may receive the one or more decoded or otherwise converted instructions or control signals that represent and/or are derived from the vector cache line write back instruction. The cache coherency system may also receive the source packed memory indices operand 348. In some embodiments, the cache coherency system may also optionally be coupled with a set of general-purpose registers (not shown), for example, to receive information to be used to convert the memory indices to memory addresses. By way of example, a memory index may be converted into a memory address using a common scale and a common base (e.g., as memory address=memory index*scale+base). Other ways of converting the indices to addresses are also contemplated. In some embodiments, the cache coherency system may be operative in response to and/or as a result of the vector cache line write back instruction (e.g., in response to one or more instructions or control signals decoded from the instruction) to cause any dirty cache lines in any caches in a coherency domain, which are to have stored therein data for any of a plurality of memory addresses that are to be indicated by any of the memory indices of the source packed memory indices operand, to be written back toward a one or more memories/storage devices.

In some embodiments, the cache coherency system 338, responsive to the instruction, may perform a write back 350 toward the memories/storage devices 324 of any dirty cache lines, in any caches 340 at any cache levels of the processor 302 in a coherency domain, which are to have stored therein data for any of a plurality of memory addresses that are to be indicated by any of the memory indices of the source packed memory indices operand 348. In one aspect, the dirty cache lines may be those that are in a modified cache coherency protocol state (e.g., which may even be the case if a same value is rewritten over itself such that the actual value stored in the cache line did not change in magnitude). As shown, in some embodiments, the cache coherency system may include and/or may control one or more cache controllers 342 of their respective one or more cache(s) 340) to initiate the write backs of the dirty cache lines implicated by the memory indices. Alternatively, other units or logic of the processor may optionally initiate and/or perform the write backs as desired for the particular microarchitecture.

As shown, in the illustrated embodiment, the vector cache line write back instruction may potentially cause the write back to store the data from the caches to store buffers 348 in a memory subsystem unit 314, and the instruction may then complete before the data from the caches is actually stored in the memories/storage devices 324. In such an embodiment, the memory subsystem unit may be operative to ensure the proper memory ordering rules are met, such as subsequent read of the written data is serviced from the write buffers, such that this posted behavior of writes is not visible to accesses to volatile memory. In persistent memory implementations where it is desired to ensure that writes to the memories/storage devices (e.g., persistent memory) are indeed written to persistent memory (e.g., committed to persistence), any volatile buffers or other microarchitectural structures may be emptied. In one aspect, a persistent commit instruction may optionally be used to commit write or store data queued in the memory subsystem (e.g., the memory subsystem unit 314) to the persistent memory. The persistent commit instruction may apply those stores that have been accepted therein to the memories/storage devices. Alternatively, in various other embodiments, the vector cache line write back instruction may cause the write back to store the data from the caches to other locations or components in the processor that are able to ensure that proper memory ordering rules are met, or to an intermediate battery backed volatile storage or buffer, or all the way to the system memory. That is, various embodiments of vector cache line write back instructions may cause the dirty cache lines to be written back from the caches to various different locations leading towards or in some cases at the memories/storage devices 324.

In some embodiments, cache coherency system 338, responsive to the instruction, may broadcast, transmit, or otherwise provide one or more cache line write back signals 352 on the bus, interconnect, or other coupling mechanism 354. These signal(s) may be operative to signal any other caches 311 of any other processors 303, or other components, at any cache levels, which are in the same coherency domain, to write back toward the memories/storage devices 324 (e.g., into respective memory subsystem units) any dirty cache lines, which are to have stored therein data for any of a plurality of memory addresses that are to be indicated by any of the memory indices of the source packed memory indices operand 348.

In some embodiments, the signal(s) 352 may be provided for memory addresses regardless of whether or not the memory addresses are cached in the caches 340 of the processor 302 performing the instruction. In some embodiments, the signal(s) 352 may be provided for memory addresses regardless of a state of the cache lines in the caches 340 of the processor 302 performing the instruction. For example, the signal(s) 352 may be provided regardless of whether the cache lines are in a modified state or are in an un-modified state in the caches 340. In some embodiments, the signal(s) 352 may be provided for memory addresses regardless of both whether or not the memory addresses are cached in the caches 340 of the processor 302, and regardless of a state of the cache lines in the caches 340 of the processor 302. As shown, in some embodiments, the cache coherency system may include logic within and/or may control a bus interface unit 344 to transmit or otherwise provide the one or more cache line write back signals on a bus or other interconnect. Alternatively, other units or logic may transmit or otherwise provide the signal(s) 352 on a bus or other interconnect as desired for the particular design or microarchitectural implementation.

Now, as its name implies, the vector cache line write back instruction is a vector instruction not a scalar instruction, and is able to cause write backs for a plurality of memory addresses (e.g., up to a vectors worth). Also, the vector cache line write back instruction specifies or otherwise indicates a source packed memory indices operand that has a plurality of memory indices, instead of just a single scalar memory index. In some embodiments, the source packed memory indices operand may be stored in a packed data register, instead of a register not used to store packed data operands (e.g., a general-purpose register). Representatively, in various embodiments, the source packed memory indices operand may be a 64-bit, 128-bit, 256-bit, 512-bit, 1024-bit, or wider operand, and may have at least two, four, eight, sixteen, thirty-two, or more than thirty-two memory indices. In some embodiments, the memory indices may be 32-bit doubleword or 64-bit quadword memory indices, although the scope of the invention is not so limited. In various embodiments, the memory indices may correspond to linear, virtual, or logical memory addresses when address translation is enabled. Alternatively, in other embodiments, the memory indices may correspond to physical addresses, for example, in real mode and/or when address translation is disabled. In some embodiments, the memory address may correspond to a byte memory location, although this is not required. In some embodiments, the memory addresses may potentially/optionally represent non-contiguous memory addresses and/or may potentially/optionally be in non-sequential cache lines in the memories/storage devices.

In some embodiments, the cache lines may optionally be flushed and/or invalidated from the processor caches (e.g., whether or not they are dirty or clean). Alternatively, in other embodiments, the cache lines may optionally be retained in the processor caches and changed to an un-modified state. Retaining the cache lines in the caches may represent a performance optimization (which may be treated as a hint by the processor logic) to reduce the possibility of a cache miss on a subsequent access. In one aspect, the processor may retain the cache lines at cache level in the cache hierarchy, and in some cases, may invalidate the line from the cache hierarchy. For usages that only need to write back modified data from the cache lines to the one or more memories and/or storage devices, but do not require that the lines are invalidated, and where subsequent accesses to the data are expected, improved performance may be achieved by retaining the cache lines in the processor caches.

One possible advantage of the vector cache line write back instruction is that it may help to promote vectorization and/or may help to avoid a need for code to fall out of a vector mode of processing data into scalar mode of processing data in order to carry out the multiple write back operations. By way of example, code may use a scatter or other vector store instruction to store a given number of data elements (e.g., a vectors worth) to the given number of memory addresses indicated by the given number of memory indices. If the vector cache line write back instruction were not available, then the given number of separate scalar cache line flush or other cache line write back instructions may be needed to each separately or individually write back a different corresponding one of the given number of data elements. Thus, from multiple to potentially many separate scalar cache line write back instructions could be needed depending upon the given number of data elements and/or memory indices of the scatter instruction. Moreover, additional instructions would generally be needed to extract the individual memory indices from a packed operand (e.g., the packed memory indices operand that was used by the preceding scatter instruction) and/or move the extracted memory indices (e.g., from a packed data register to one or more general-purpose registers). However, by including the vector cache line write back instruction, there may be no need to fall out of the vector mode. Rather, the single vector cache line write back instruction may be used to write back each of the given number of data elements within the confines of the execution of a single instruction. Moreover, there may be no need for the additional instructions to extract the individual memory indices and/or move them from the packed data register to other registers (e.g., general-purpose registers). Accordingly, the vector cache line write back instruction may help to reduce the total number of instructions that need to be executed (e.g., may help to reduce the amount of instruction bloat in code), which may also tend to help increase performance.

Another possible advantage of the vector cache line write back instruction is that it may help to simplify programing and/or compilation. If the vector cache line write back instruction were not available, then the need to fall out of a vector mode of processing data into scalar mode of processing data and/or to use the multiple scalar cache line flush or other cache line write back instructions would generally tend to complicate programming and compilation. The increased number of instructions and/or the need to interleave vector and scalar operations may tend to complicate the algorithms. Performing the scalar cache line write back instructions may tend to involve tedious book-keeping to correlate them with the packed memory indices of the scatter instruction. This may tend to increase the complexity of programming and/or compilation. The amount of complexity may further increase if predicated or masked scatter instructions were used to selectively scatter only some of the data elements (e.g., unmasked data elements) without scattering other data elements (e.g., masked out data elements). In this case, the programmer or compiler may additionally need to interpret the masks of the masked scatter instructions in order to perform the separate or individual scalar cache line flush instructions. Again, this may result in increased numbers of instructions, and potentially increased amounts of branching, which may tend to degrade performance.

These advantages may be observed especially in implementations that use persistent memory, for example, due to an increased amount of flushing or otherwise writing data out of the caches toward the persistent memory so that the data can become persistent. However, it is to be appreciated that the vector cache line write back instructions are useful whether or not persistent memory is being used. For example, even in an implementation in which persistent memory is not being used for primary storage and/or is not directly addressable by the processor, the vector cache line write back instructions are useful to help manage data in the processors caches (e.g., to help improve the efficiency or utilization of the caches). As one illustrative example, a thread may iterate a few times to compute a number of values in a sparse data structure. Once the final values have been computed, the thread may want to evict cache lines associated with the values from the cache hierarchy. This may be done in order to manage the caches, improve cache utilization or efficiency, or for other purposes. For example, this may be done to help free up the cache for other more relevant data. As another example, this may also help to avoid future modified (M)-to-invalidated (I) and/or modified (M)-to-shared (S) write back bursts. The vector cache line write back instruction is therefore useful to flush or otherwise write back cache lines from the cache hierarchy whether or not persistent memory is used. These are just a few illustrative examples of possible advantages that may be achieved, and it is to be appreciated that embodiments are not limited to achieving these advantages.

The cache coherency system, cache controller(s), bus interface unit and/or the processor may include specific or particular logic (e.g., transistors, integrated circuitry, or other hardware potentially combined with firmware (e.g., instructions stored in non-volatile memory) and/or software) that is operative to perform the vector cache line write back instruction and/or store the result in response to and/or as a result of the vector cache line write back instruction (e.g., in response to one or more instructions or control signals decoded from the vector cache line write back instruction).

To avoid obscuring the description, a relatively simple processor 302 has been shown and described. However, the processor may optionally include other processor components. For example, various different embodiments may include various different combinations and configurations of the components shown and described for any of FIG. 9 and/or any of FIGS. 13-16. All of the components of the processor may be coupled together to allow them to operate as intended.

Figure 4:
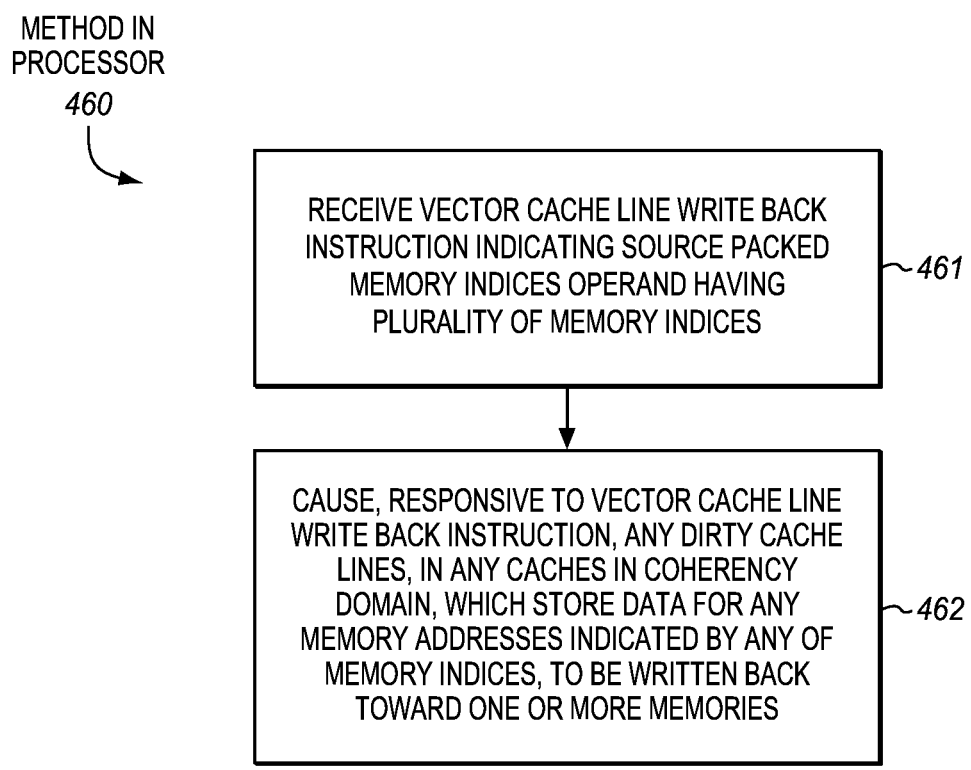
FIG. 4 is a block flow diagram of an embodiment of a method of performing an embodiment of a vector cache line write back instruction.

FIG. 4 is a block flow diagram of an embodiment of a method 460 of performing an embodiment of a vector cache line write back instruction. In various embodiments, the method may be performed by a processor, instruction processing apparatus, or other digital logic device. In some embodiments, the method of FIG. 4 may be performed by and/or within the processor of FIG. 3. The components, features, and specific optional details described herein for the processor of FIG. 3, also optionally apply to the method of FIG. 4. Alternatively, the method of FIG. 4 may be performed by and/or within a similar or different processor or apparatus. Moreover, the processor of FIG. 3 may perform methods the same as, similar to, or different than those of FIG. 4.

The method includes receiving the vector cache line write back instruction, at block 461. In various aspects, the instruction may be received at a processor or a portion thereof (e.g., an instruction fetch unit, a decode unit, a bus interface unit, etc.). In various aspects, the instruction may be received from an off-processor and/or off-die source (e.g., from memory, interconnect, etc.), or from an on-processor and/or on-die source (e.g., from an instruction cache, instruction queue, etc.). The vector cache line write back instruction may specify or otherwise indicate a source packed memory indices operand having a plurality of memory indices.

The method includes causing, at block 462, responsive to the vector cache line write back instruction, any dirty cache lines, in any caches in a coherency domain, which store data for any of a plurality of memory addresses that are indicated by any of the memory indices of the source packed memory indices operand, to be written back toward one or more memories and/or storage devices. In some embodiments, the method may also include invalidating any implicated cache lines (e.g., those that are dirty and written back as well as those that are un-modified, etc.). In some embodiments, the method may also include changing a state of the dirty cache lines that are written back to an un-modified state.

Figure 5:
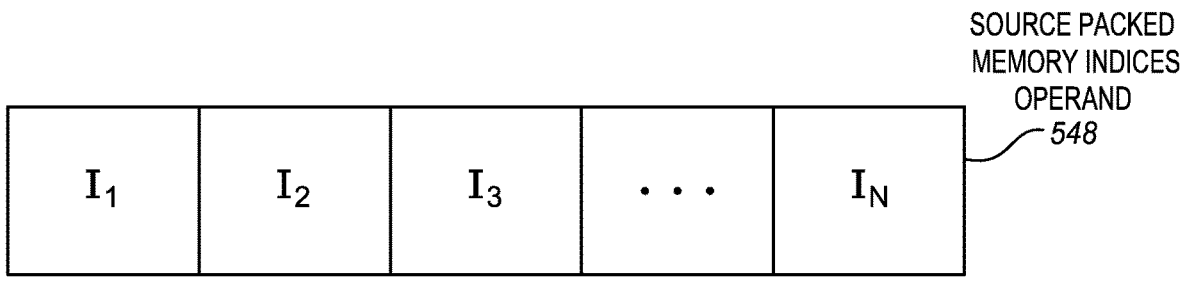
FIG. 5 is a block diagram of an example embodiment of a source packed memory indices operand that is suitable for an embodiment of a vector cache line write back instruction.

FIG. 5 is a block diagram of an example embodiment of a source packed memory indices operand 548 that is suitable for an embodiment of a vector cache line write back instruction. The source packed memory indices operand has N packed memory indices I1 through IN. In various embodiments, the number (N) of memory indices may be at least two, at least four, at least eight, at least sixteen, at least thirty-two, or more than thirty-two. In various embodiments, the width of the source packed memory indices operand may be 64-bits, 128-bits, 256-bits, 512-bits, 1024-bits, or more than 1024-bits. Alternatively, wider, narrower, or just different width operands may optionally be used instead. In various embodiments, the width of each memory index may be 16-bit, 32-bit, or 64-bits. Alternatively, wider, narrower, or just different width memory indexes may optionally be used instead.

Figure 6:
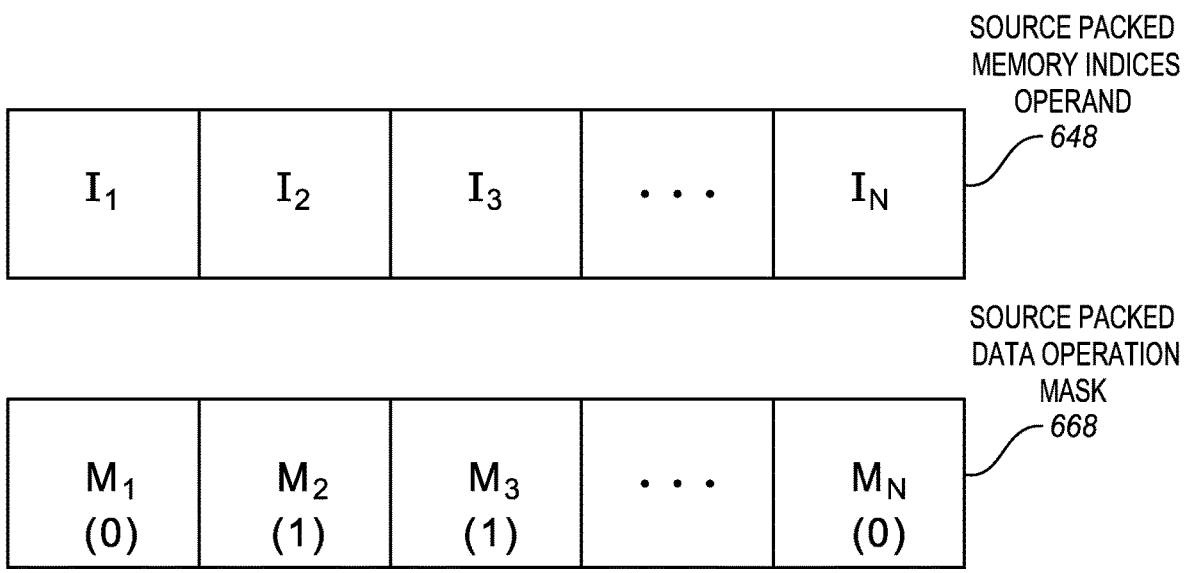
FIG. 6 is a block diagram of an example embodiment of a source packed memory indices operand, and a corresponding source packed data operation mask operand, which are suitable for an embodiment of a vector cache line write back instruction.

FIG. 6 is a block diagram of an example embodiment of a source packed memory indices operand 648, and a corresponding source packed data operation mask operand 668, which are suitable for an embodiment of a vector cache line write back instruction. The source packed memory indices operand 648 may have the same characteristics and variations as previously described for the source packed memory indices operand 548 of FIG. 5.

The source packed data operation mask operand 668 may also be referred to herein simply as an operation mask, predicate mask, or mask. The mask may represent a predicate operand or conditional control operand that may be used to mask, predicate, or conditionally control whether or not corresponding operations (e.g., corresponding memory address implicated dirty cache line write back operations) are to be performed. In some embodiments, the masking or predication may be at per-memory index granularity, such that operations on different memory indices may be predicated or conditionally controlled separately and/or independently of others. The mask may include multiple mask elements (M), which may represent predicate elements or conditional control elements. In one aspect, the mask elements (M) may be included in a one-to-one correspondence with corresponding memory indices (I) of the source packed memory indices operand. As shown, the source packed data operation mask operand 668 may have N corresponding mask elements M1 through MN. Each mask element may correspond to a different one of the memory indices in a corresponding or relative position within the operands. For example, M1 may correspond to I1, M2 may correspond to I2, and so on.

In some embodiments, each mask element may be a single mask bit. In such cases, the mask may have a bit for each memory index. A value of each mask bit or element may control whether or not a corresponding operation (e.g., a corresponding memory address implicated dirty cache line write back operation) is to be performed. Each mask bit may have a first value to allow the operation to be performed using the corresponding memory index, or may have a second different value to not allow the operation to be performed using the corresponding memory index. According to one possible convention, a mask bit cleared to binary zero (i.e., 0) may represent a masked out or predicated operation that is not to be performed, whereas a mask bit set to binary one (i.e., 1) may represent an unmasked or non-predicated operation that is to be performed. In the illustrated example, the mask bit values are, from the left to the right, 0, 1, 1, 0, although this is just one example. According to this example, write backs of dirty cache lines in a cache coherency domain that store or are implicated by the memory indices I1 and IN are predicated and do not need to be performed, but write backs of dirty cache lines in a cache coherency domain that store or are implicated by the memory indices I2 and I3 are not predicated and do need to be performed. In other embodiments, two or more bits may optionally be used for each mask element (e.g., each mask element may have a same number of bits as each corresponding memory index and either all bits or as few as a single bit (e.g., a most significant bit or least significant bit) may be used for the masking or predication.

FIG. 7 is a block diagram illustrating an embodiment of an optionally masked vector cache line write back operation 770 that may be performed in response to an embodiment of an optionally masked vector cache line write back instruction. The instruction may specify or otherwise indicate a source packed memory indices operand 748 having a plurality of packed memory indices (I). In the illustration, the source packed memory indices operand has N memory indices I1 through IN. The source packed memory indices operand and the memory indices may have the same characteristics and variations as previously described for the operand 548 and indices of FIG. 5. In several illustrative example embodiments, the width of the source packed memory indices operand may be 64-bits, 128-bits, 256-bits, 512-bits, or 1024-bits, and the width of each memory index may be 16-bits, 32-bits, or 64-bits, although the scope of the invention is not so limited.

In some embodiments, the instruction may also optionally specify or otherwise indicate an optional source packed data operation mask operand 768 having a plurality of mask elements (M), although this is not required. Other embodiments of the instructions optionally don't need to indicate or use such a mask. In the illustration, the mask has N mask elements M1 through MN. There may be one mask element for each corresponding memory index. In one aspect, the corresponding mask elements and memory indices may be in same relative positions within the operands. For example, I1 and M1 may correspond, I2 and M2 may correspond, and so on. The number of mask elements may vary just as the number of memory indices may vary. The mask and the mask elements may have the same characteristics and variations as previously described for the mask 668 and mask elements (M) of FIG. 6. According to one possible convention, as shown in the illustration, a mask bit cleared to binary zero (i.e., 0) may represent a masked out operation that need not be performed, whereas a mask bit set to binary one (i.e., 1) may represent an unmasked operation that is to be performed. In the illustrated example, the mask bits or elements corresponding to M1, M2, and MN are unmasked such that the corresponding operations will be performed, whereas the mask bit or element corresponding to M3 is masked out such that the corresponding operation will not be performed.

The optionally masked vector cache line write back operation may be performed in response to and/or as a result of the instruction. The optionally masked operation may cause cache line write backs 776 to be performed toward the memories/storage devices 724 for any dirty cache lines (CL), in any caches at any cache levels in any processors or other entities which are in the cache coherency domain (including one or more caches 740), which store data for or otherwise correspond to any memory addresses which are indicated by and/or derived from the memory indices (I) in the source packed memory indices operand 748, subject to the masking or predication of the corresponding optional mask elements (M) of the optional mask 768. In the illustrated example, the memory indices I1, I2, and IN are unmasked by the corresponding mask elements M1, M2, and MN such that the corresponding write back operations are to be performed. As shown, any dirty cache lines (CL) may be written back to memory locations in the memories/storage devices 724 that are indicated or derived from the memory indices I1, I2, and IN. Conversely, in this example, the memory index I3 is masked out by the corresponding masked out mask element M3 such that the corresponding write back operation is not to be performed. As shown by an asterisk (*), a dirty cache line is not written back to the memory location indicated by the memory index I3, but rather the initial cache line in this memory location may remain unchanged.

Initially, in some embodiments, the dirty cache line write backs 776 may not be made all the way to the memories/storage devices 724 responsive to the instruction. Rather, the write backs may initially and temporarily be made into an intermediate location. As shown, in some embodiments, the intermediate location may be store buffers 748 of a memory subsystem unit of the processor. As shown at reference 775, the store buffers may temporarily buffer or otherwise store any dirty cache lines corresponding to the memory indices I1, I2, and IN, but not corresponding to I3 since it is masked out. The memory subsystem unit may be operative to ensure the proper memory ordering rules are met. Alternatively, the write backs may optionally be to other locations, such as, for example, all the way to the memories/storage devices 724, to an intermediate power failure safe buffer, an intermediate battery backed intermediate location, or another component or storage that is able to ensure proper memory ordering rules are met, to name a few examples. Subsequently, stores 778 to the memories/storage devices 724 may be performed outside of the execution of the instruction to complete the write backs.

In some embodiments, in addition to writing back any dirty cache lines storing data for the memory addresses indicated by or corresponding to the memory indices, as shown at reference 771, these cache lines may optionally be invalidated in any caches in the coherency domain in which they were stored. In addition to the operation 770 writing back these dirty cache lines, these dirty cache lines may also concurrently or contemporaneously invalidate these cache lines (e.g., change the cache coherency protocol states to invalid). This may represent flushing these cache lines from any caches in the cache coherency domain. The invalidated data in the caches may soon be replaced by other data. In addition to the dirty cache lines, other cache lines implicated by the memory indices (e.g., un-modified cache lines) may also be invalidated.

In other embodiments, in addition to writing back the dirty cache lines storing data for the memory addresses indicated by the memory indices, as shown at reference 773, these cache lines may optionally be retained or kept stored in any caches in the coherency domain in which they were stored, but the cache coherency protocol state of these cache lines may be changed to an un-modified state. In addition to the operation 770 writing back these dirty cache lines, these dirty cache lines may also concurrently or contemporaneously be changed to an un-modified cache coherency protocol state. Retaining the data in the caches allows it to be subsequently read from the caches again and utilized.

In other embodiments, an instruction may optionally combine a vector store indexed or scatter operation with a vector cache line write back operation. Representatively, initially the scatter operation may be performed to scatter or store data elements into caches in a cache coherency domain based on a set of memory indices, and then the vector cache line write back operation may use the same memory indices to write back the dirty cache lines out of the cache coherency domain toward the memories/storage devices.

FIG. 8 is a block diagram illustrating an embodiment of an optionally masked vector store indexed and cache line write back operation 880 that may be performed in response to an embodiment of an optionally masked vector store indexed and cache line write back instruction. The instruction may specify or otherwise indicate a source packed memory indices operand 848 having a plurality of packed memory indices (I). In the illustration, the source packed memory indices operand has N memory indices I1 through IN. The source packed memory indices operand and the memory indices may have the same characteristics and variations as previously described for the operand 548 and indices of FIG. 5. In several illustrative example embodiments, the width of the source packed memory indices operand may be 64-bits, 128-bits, 256-bits, 512-bits, or 1024-bits, and the width of each memory index may be 16-bits, 32-bits, or 64-bits, although the scope of the invention is not so limited.

The instruction may also specify or otherwise indicate a source packed data elements operand 881 having a plurality of packed data elements (B). In the illustration, the source packed data elements operand has N memory indices B1 through BN. There may be one data element for each corresponding memory index and the number of data elements may vary just as the number of memory indices may vary. In several illustrative example embodiments, the data elements may be 32-bit single precision floating point or 64-bit double precision floating point data elements, although the scope of the invention is not so limited. There is no requirement that the size or width of the data elements be the same as the size or width of the corresponding memory indices, or that the size or width of the source packed data element operand be the same as the size or width of the source packed memory indices operand.

In some embodiments, the instruction may also optionally specify or otherwise indicate an optional source packed data operation mask operand 868 having a plurality of mask elements (M), although this is not required. Other embodiments of the instructions optionally don't need to use such a mask. In the illustration, the mask has N mask elements M1 through MN. There may be one mask element for each corresponding memory index and/or each corresponding data element. In one aspect, the corresponding mask elements, memory indices, and data elements may be in same relative positions within the operands. For example, I1, B1, and M1 may all correspond, I2, B2, and M2 may all correspond, and so on. The number of mask elements may vary just as the number of memory indices and/or data elements may vary. The mask and the mask elements may have the same characteristics and variations as previously described for the mask 668 and mask elements (M) of FIG. 6. According to one possible convention, as shown in the illustration, a mask bit cleared to binary zero (i.e., 0) may represent a masked out operation that need not be performed, whereas a mask bit set to binary one (i.e., 1) may represent an unmasked operation that is to be performed. In the illustrated example, the mask bits or elements corresponding to M1, M2, and MN are unmasked such that the corresponding operations will be performed, whereas the mask bit or element corresponding to M3 is masked out such that the corresponding operation will not be performed.

The optionally masked vector store indexed and cache line write back operation may be performed in response to and/or as a result of the instruction. The optionally masked operation may scatter, write, or store 878 data elements (B) from the source packed data element operand 881 to memory locations in one or more memories and/or storage devices 824 that are indicated by the corresponding memory indices (I) in the source packed memory indices operand 848, subject to the masking or predication of the corresponding optional mask elements (M) of the optional mask 868. In some embodiments, the data elements (B) may be scattered or stored to optionally/potentially non-contiguous memory locations and/or to optionally/potentially non-sequential cache lines in the memories/storage devices 824, depending upon the particular flexible values of the memory indices (I). For example, as shown in the illustration, the data element B1 may be stored to a memory location indicated by memory index I1, the data element B2 may be stored to a memory location indicated by memory index I2, and the data element BN may be stored to a memory location indicated by memory index IN. Conversely, in this example, the operation is masked out for data element B3 by masked out mask element M3. As shown by an asterisk (*) the data element B3 may not be stored in this memory location, but rather the initial value in this memory location may remain unchanged. In some embodiments, the storing of the data elements (B) into the memories/storage devices may be performed sequentially, and may be ordered across the operands. For example, the lowest order unmasked data element (e.g., B1) may be stored, then the next lowest order data element (e.g., B2) may be stored, and so on up through the most significant unmasked data element (e.g., BN) being stored.

Initially, stores 874 to implement the instruction may not be made all the way to the memories/storage devices 824, but may temporarily be made into one or more caches 840 in a cache coherency domain. The optionally masked operation may also include performing cache line write backs 876 from the cache(s) 840 toward the memories/storage devices 824 of any dirty cache lines, in any caches at any cache levels in any processors or other entities which are in the cache coherency domain (including the one or more caches 840), which store data corresponding to memory addresses which are indicated by the memory indices (I) in the source packed memory indices operand 848, subject to the masking or predication of the corresponding optional mask elements (M) of the optional mask 868. As shown, in some embodiments, the cache line write hacks may not be performed all the way to the memories/storage devices responsive to the instruction. Rather, in some embodiments, the cache line write hacks may be performed to store buffers 848 of a memory subsystem unit, which is able to ensure the proper memory ordering rules are met. Initially the data elements B1, B2, and BN may be written back from the cache(s) 840 into these store buffers 848 before they are subsequently stored into the memories/storage devices 824. In other embodiments, the write backs may optionally be to other locations, such as, for example, all the way to the memories/storage devices 824, to an intermediate power failure safe buffer, an intermediate battery backed intermediate location, or another component or storage that is able to ensure proper memory ordering rules are met, to name a few examples.

In some embodiments, in addition to writing back the dirty cache lines storing data corresponding to the memory addresses indicated by the memory indices, these cache lines may optionally be invalidated in any caches in the coherency domain in which they were stored. For example, the cache coherency protocol state of these cache lines may be changed to an invalid state. This may represent flushing these cache lines from any caches in the cache coherency domain. As shown at reference 882, in some embodiments, the operation may store B1, B2, and BN in the cache(s) 840, and concurrently or contemporaneously invalidate the corresponding cache lines having B1, B2, and BN (e.g., change the cache coherency protocol states to invalid). While this approach does not purely bypass the caches, it generally tends to have much the same effect on the cache(s) as a non-temporal store that completely bypasses the cache(s), since the invalidated data in the caches may soon be replaced by other data.

In other embodiments, in addition to writing back the dirty cache lines storing data pertaining to the memory addresses indicated by the memory indices, these cache lines may optionally be retained or kept stored in any caches in the coherency domain in which they were stored, but the cache coherency protocol state of these cache lines may be changed to an un-modified state. As shown at reference 884, in some embodiments, the operation may store B1, B2, and BN in the cache(s) 840, and concurrently or contemporaneously change the cache coherency protocol state of the corresponding cache lines having B1, B2, and BN to an un-modified state. Retaining the data in the caches allows it to be subsequently read from the caches again and utilized.

Advantageously, such combination of a scatter or vector store indexed operation with a vector cache line write back operation may help to simplify programming and compilation. There may be no need to map a subsequent separate vector cache line write back instruction, or set of separate scalar cache line flush instructions, to a scatter instruction. Rather, a single instruction may merge both operations symbiotically and with reduced chance for programming error due to incorrect mapping. This may also reduce the overall number of instructions that need to be executed and may help to improve performance.

In one aspect, such an instruction operation may provide an opportunity for microarchitectural optimization from a vector scatter flush/write-back operation. In the process of performing a scatter operation, a core may obtain exclusive ownerships of the various cache lines that the scatter operation covers. That same core may implement a greedy heuristic for holding the exclusive ownerships of those cache lines for a few more clock cycles. Thus, if a scatter flush operation comes along soon enough, which is expected to be commonly the case, it does not have to perform a global handshake since other cores cannot then have those lines in modified (M), exclusive (E), or shared (S) states, due to the ownership the current core obtained and held for a few cycles. Thus, the marginal cost of such a vector scatter flush/write-back operation should be negligible as these operations would not require global coordination for evicting affected cache lines.

Certain processors are able to execute instructions out-of-order (OoO) relative to the original program order in which the instructions appear in the original program or code. In addition to OoO execution, weakly ordered memory types can be used to achieve higher processor performance through such techniques as speculative reads, write-combining, and write-collapsing. Such aspects may pose certain challenges when locations in one or more memories are accessed by loads and/or stores. The degree to which a consumer of data recognizes or knows that the data is weakly ordered varies among applications and may be unknown to the producer of this data. Representatively, the result of a store instruction may become visible to the processor executing the store instruction immediately (e.g., may be stored in that processors caches), but may not become visible immediately to other processors or other entities in the same system. Another processor in the same system may write to the same memory location (e.g., to one of its caches), but it could take some time for the results of these store operations to be committed to memory. Due to the caching, it could appear to both processors that their store operation executed first.

In some embodiments, one or more memory access fencing instructions may be included before and/or after a vector cache line write back instruction to help serialize memory accesses relative to the dirty cache line write backs. One suitable type of fencing instruction is a full memory access fence instruction that is operative to serialize both load and store operations. For example, in some embodiments, the full memory fence instruction may be operative to perform a serializing operation on all load-from-memory and store-to-memory instructions that were issued prior the memory fence instruction. This serializing operation may guarantee that every load and store instruction that precedes the memory fence instruction in program order becomes globally visible before any load or store instruction that follows the memory fence instruction in program order. Another suitable type of fencing instruction is a store fence instruction that is operative to serialize store operations. For example, in some embodiments, the store fence instruction may be operative to perform a serializing operation on all store-to-memory instructions that were issued prior the store fence instruction. This serializing operation may guarantee that every store instruction that precedes the store fence instruction in program order becomes globally visible before any store instruction that follows the store fence instruction. Such memory access fencing instructions may help to ensure memory access ordering between routines that produce weakly-ordered results and routines that consume that data.

In other embodiments, a vector cache line write back instruction may optionally incorporate or integrate a memory access fencing capability. For example, in some embodiments, the vector cache line write back instruction may incorporate or integrate a store fence capability or attribute that allows the instruction to serialize store instructions/operations. In some embodiments, in addition to causing dirty cache lines to be written back as previously described, the vector cache line write back instruction may also cause the processor to perform a serializing operation on all store-to-memory instructions that were issued prior the vector cache line write back instruction. This serializing operation may guarantee that every store instruction that precedes the vector cache line write back instruction in program order becomes globally visible before any store instruction that follows the vector cache line write back instruction. Alternatively, the vector cache line write back instruction may incorporate or integrate a full memory access fence capability or attribute that allows the instruction to serialize both load and store instructions/operations. In some embodiments, in addition to causing dirty cache lines to be written back as previously described, the vector cache line write back instruction may also cause the processor to perform a serializing operation on all load-from-memory and store-to-memory instructions that were issued prior the vector cache line write back instruction. This serializing operation may guarantee that every load and store instruction that precedes the vector cache line write back instruction in program order becomes globally visible before any load or store instruction that follows the vector cache line write back instruction in program order. These fencing attributes or capabilities may be used with the various different embodiments of the vector cache line write back instructions disclosed herein, such as, for example, those that invalidate indicated cache lines in the caches, those that retain indicated cache lines in the caches but in an unmodified state, and those that additionally incorporate a scatter operation. Such fencing attributes or capabilities may help to ensure memory access ordering between routines that produce weakly-ordered results and routines that consume that data. In addition, such fencing attributes or capabilities may help to reduce the number of instructions (e.g., eliminate separate fencing instructions) and/or reduce the chances for programming errors caused by incorrect memory access ordering.

In implementations that optionally use persistent memory, a store to persistent memory is generally not persistent until the store data either reaches the persistent memory or an intermediate power-fail protected buffer or storage. While the vector cache line write back instruction may help to ensure that the data is written back from the volatile caches, the data may not have actually reached such a destination. For example, as described above, the instruction may in some embodiments complete as soon as the write back data reaches the memory subsystem units write buffers. This implies that to ensure writes to persistent memory are indeed committed to persistence, software may further need to ensure write backs of data from such volatile write buffers or other non-persistent structures of the processor have completed all the way to persistency or durability.

In some embodiments, a separate persistent commit instruction may optionally be used with the vector cache line write back instructions disclosed herein. The persistent commit instruction may be operative to commit stores to persistent memory. In one aspect, the persistent commit instruction may be operative to cause certain store-to-memory operations to persistent memory ranges to become persistent (power failure protected) by applying those stores that have been accepted to memory. In one aspect, if the persistent commit instruction is executed after a store to a persistent memory range is accepted to memory, the store may be ensured to become persistent when the persistent commit instruction becomes globally visible.

In other embodiments, a vector cache line write back instruction integrating or incorporating a store or full memory access fence attribute or capability may optionally additionally integrate or incorporate a persistent commit attribute or capability. In some embodiments, in addition to causing dirty cache lines to be written back as previously described, and in addition to memory access fencing as previously described, the vector cache line write back instruction may also cause the processor to commit stores, including the write backs of the dirty cache lines, to persistent memory.

Such a vector cache line write back instruction may be operative to cause certain store-to-memory operations, including the dirty cache line write back operations, to persistent memory ranges to become persistent (power failure protected) by applying those stores that have been accepted to the persistent memory. In one aspect, the vector cache line write back instruction with the persistent commit attribute or capability may cause any dirty cache line write backs to a persistent memory range accepted to memory, as well as any preceding stores to the persistent memory range accepted to memory, to be ensured to become persistent when the vector cache line write back instruction becomes globally visible. In some embodiments, instruction following such a vector cache line write back instruction may be permitted to complete only upon completion of the write backs of the vector cache line write back instruction into a power-safe regime.

Figure 9:
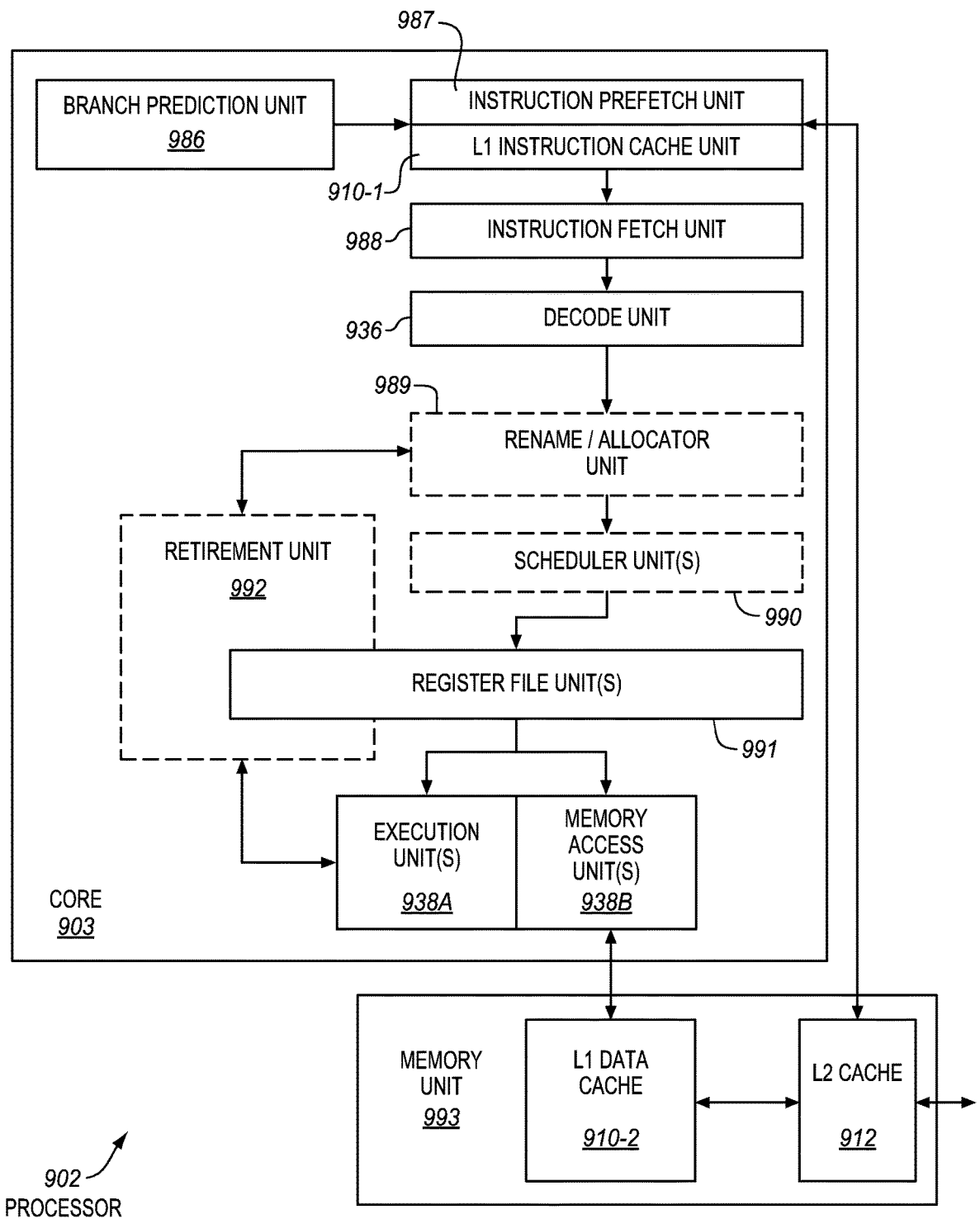
FIG. 9 is a block diagram of a detailed example embodiment of a processor that is suitable for implementing embodiments of the invention.

FIG. 9 is a block diagram of a detailed example embodiment of a processor 902 that is suitable for implementing embodiments of the invention. The processor includes at least one core 903 that is able to perform an embodiment of a vector cache line write back instruction. The core includes a branch prediction unit 986 to predict branches in program flow. The branch prediction unit is coupled with an instruction prefetch unit 987. The instruction prefetch unit may prefetch or otherwise receive instructions, including the vector cache line write back instruction, from memory (e.g., through a memory unit 993). A level 1 (L1) instruction cache 910-1 is coupled with the instruction prefetch unit. The L1 instruction cache may cache or otherwise store instructions, including the vector cache line write back instruction. The processor also includes an L1 data cache 910-2 to cache or otherwise store data, including data elements and/or operands for instructions. The processor also optionally includes a level 2 (L2) cache 912. The L2 cache may be dedicated to the core, or shared by the core and one or more other optional cores (not shown). The L2 cache may store data and instructions, including the vector cache line write back instruction. An instruction fetch unit 988 is coupled with the L1 instruction cache, the L2 cache, and a decode unit 936.

The instruction fetch unit may fetch or otherwise receive instructions, including the Vector cache line write back instruction (e.g., from the L1 instruction cache or the L2 cache), and may provide the instructions to the decode unit. The decode unit may decode the instructions, including the vector cache line write back instruction, as described elsewhere herein.

The processor also includes one or more register file units 991. The register file unit(s) may include various different types of registers, such as, for example, packed data registers, general-purpose registers, a status or flags register, control or configuration registers, etc. In an embodiment where the core optionally supports out-of-order (OOO) execution, the core may also optionally include a register rename/allocator unit 989 coupled with the register file unit(s) to allocate resources and perform register renaming on registers (e.g., packed data registers associated with the vector cache line write back instruction). Further, for OOO execution, the core may optionally include one or more scheduler units 990 coupled with the decode unit, the rename/allocator unit, and one or more execution units 938A/B. The scheduler unit(s) may schedule one or more operations associated with decoded instructions, including one or more operations decoded from the vector cache line write back instruction, for execution on the execution units. The core may optionally have multiple different types of execution units, such as, for example integer execution units, floating point execution units, vector execution units, one or more memory access units 938B, and the like. For OOO execution, the core may optionally include a retirement or commit unit 992 coupled with the execution units, the register file unit(s), and the rename/allocator unit. The retirement or commit unit may be operative to retire or commit instructions.

It is to be appreciated that this is just one illustrate example of a suitable processor. In alternate embodiments the processor may include either fewer or more components. Examples of other components that may optionally be included are one or more instruction and/or data translation lookaside buffers (TLBs), one or more reorder buffers (ROBs), a reservation station, an address generation unit, a debug unit, a performance monitor unit, a power management unit. Moreover, the processor may optionally have multiple cores (e.g. at least two, at least four, at least eight, at least thirty, etc.). In some cases, all of the cores may have the same components and support the same instruction sets as the core 980. Alternatively, at least some of the cores may have different components and/or may support different instruction sets.

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to the Advanced Vector Extensions (AVX) (AVX1 and AVX2) and using the Vector Extensions (VEX) coding scheme, has been, has been released and/or published (e.g., see Intel® 64 and IA-32 Architectures Software Developers Manual, October 2011; and see Intel® Advanced Vector Extensions Programming Reference, June 2011).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

VEX Instruction Format

VEX encoding allows instructions to have more than two operands, and allows SIMD vector registers to be longer than 128 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

FIG. 10A illustrates an exemplary AVX instruction format including a VEX prefix 1002, real opcode field 1030, Mod R/M byte 1040, SIB byte 1050, displacement field 1062, and IMM8 1072. FIG. 10B illustrates which fields from FIG. 10A make up a full opcode field 1074 and a base operation field 1042. FIG. 10C illustrates which fields from FIG. 10A make up a register index field 1044.

VEX Prefix (Bytes 0-2) 1002 is encoded in a three-byte form. The first byte is the Format Field 1040 (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 1005 (VEX Byte 1, bits [7-5]) consists of a VEX.R bit field (VEX Byte 1, bit [7]-R), VEX.X bit field (VEX byte 1, bit [6]-X), and VEX.B bit field (VEX byte 1, bit[5]-B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 1015 (VEX byte 1, bits [4:0]-mmmmm) includes content to encode an implied leading opcode byte. W Field 1064 (VEX byte 2, bit [7]-W)—is represented by the notation VEX.W, and provides different functions depending on the instruction. The role of VEX.vvvv 1020 (VEX Byte 2, bits [6:3]-vvvv) may include the following: 1) VEX.vvvv encodes the first source register operand, specified in inverted (1s complement) form and is valid for instructions with 2 or more source operands; 2) VEX.vvvv encodes the destination register operand, specified in 1s complement form for certain vector shifts; or 3) VEX.vvvv does not encode any operand, the field is reserved and should contain 1011b. If VEX.L 1068 Size field (VEX byte 2, bit [2]-L)=0, it indicates 128 bit vector; if VEX.L=1, it indicates 256 bit vector. Prefix encoding field 1025 (VEX byte 2, bits [1:0]-pp) provides additional bits for the base operation field.

Real Opcode Field 1030 (Byte 3) is also known as the opcode byte. Part of the opcode is specified in this field.

MOD R/M Field 1040 (Byte 4) includes MOD field 1042 (bits [7-6]), Reg field 1044 (bits [5-3]), and R/M field 1046 (bits [2-0]). The role of Reg field 1044 may include the following: encoding either the destination register operand or a source register operand (the rrr of Rrrr), or be treated as an opcode extension and not used to encode any instruction operand. The role of R/M field 1046 may include the following: encoding the instruction operand that references a memory address, or encoding either the destination register operand or a source register operand.

Scale, Index, Base (SIB)—The content of Scale field 1050 (Byte 5) includes SS1052 (bits [7-6]), which is used for memory address generation. The contents of SIB.xxx 1054 (bits [5-3]) and SIB.bbb 1056 (bits [2-0]) have been previously referred to with regard to the register indexes Xxxx and Bbbb.

The Displacement Field 1062 and the immediate field (IMM8) 1072 contain address data.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 11A:
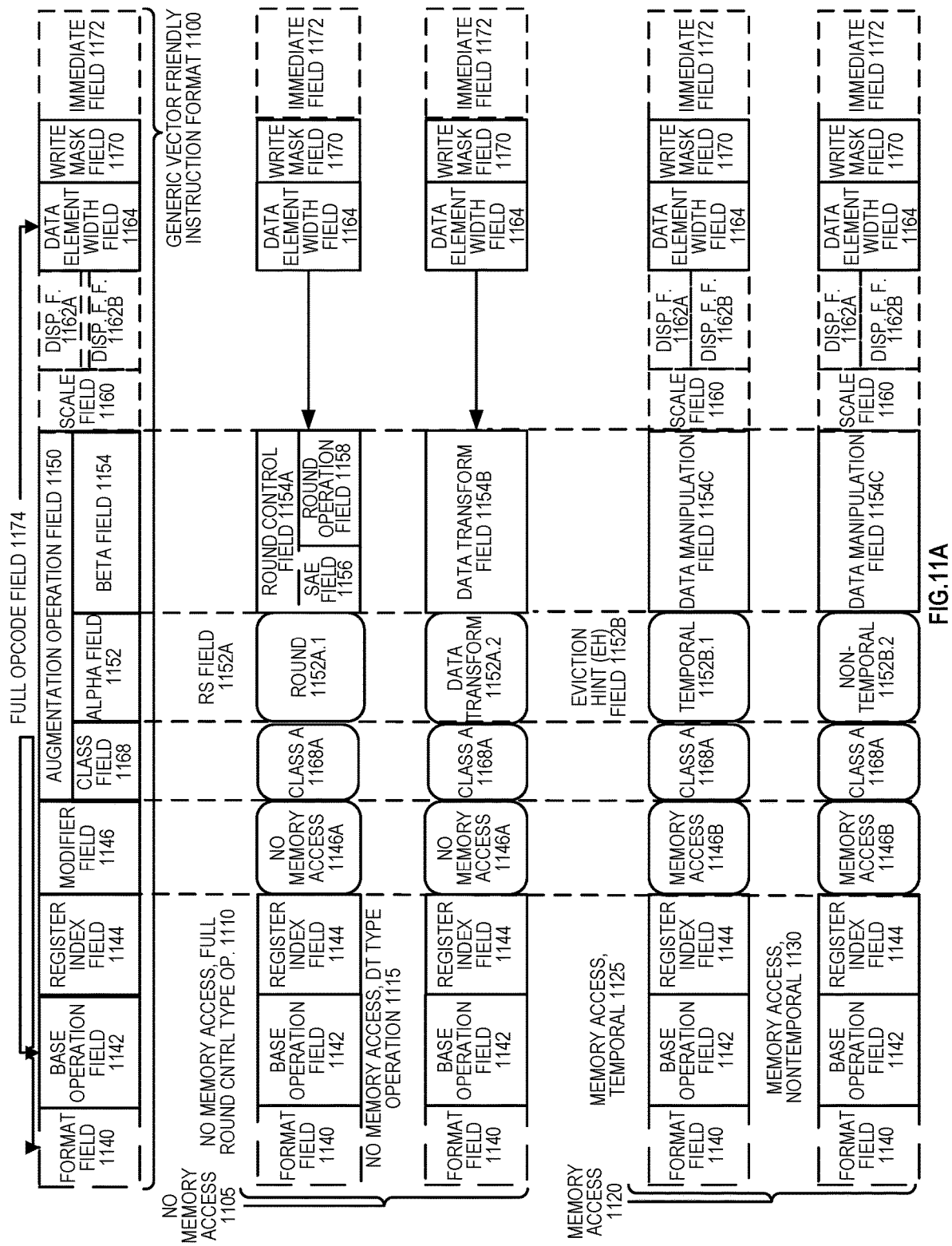
FIG. 11A-B is a block diagram illustrating an exemplary specific vector friendly instruction format and an opcode field, according to embodiments of the invention.
Figure 11B:
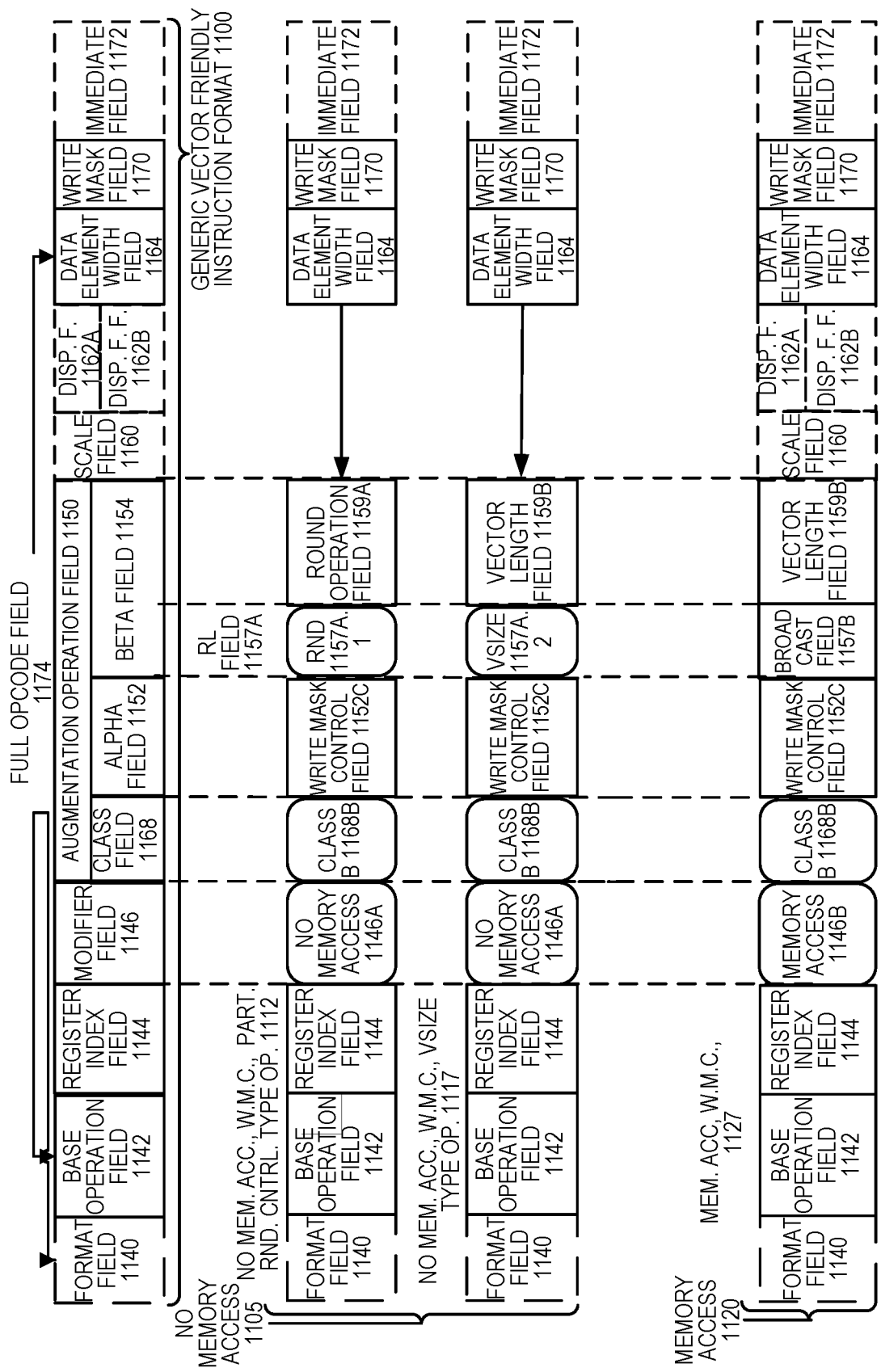

FIGS. 11A-11B are block diagrams illustrating a generic vector friendly instruction format and instruction templates thereof according to embodiments of the invention. FIG. 11A is a block diagram illustrating a generic vector friendly instruction format and class A instruction templates thereof according to embodiments of the invention; while FIG. 11B is a block diagram illustrating the generic vector friendly instruction format and class B instruction templates thereof according to embodiments of the invention. Specifically, a generic vector friendly instruction format 1100 for which are defined class A and class B instruction templates, both of which include no memory access 1105 instruction templates and memory access 1120 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 11A include: 1) within the no memory access 1105 instruction templates there is shown a no memory access, full round control type operation 1110 instruction template and a no memory access, data transform type operation 1115 instruction template; and 2) within the memory access 1120 instruction templates there is shown a memory access, temporal 1125 instruction template and a memory access, non-temporal 1130 instruction template. The class B instruction templates in FIG. 11B include: 1) within the no memory access 1105 instruction templates there is shown a no memory access, write mask control, partial round control type operation 1112 instruction template and a no memory access, write mask control, vsize type operation 1117 instruction template; and 2) within the memory access 1120 instruction templates there is shown a memory access, write mask control 1127 instruction template.

The generic vector friendly instruction format 1100 includes the following fields listed below in the order illustrated in FIGS. 11A-11B.

Format field 1140—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1142—its content distinguishes different base operations.

Register index field 1144—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1146—its content distinguishes occurrences of instructions in the generic vector instruction format that specify memory access from those that do not; that is, between no memory access 1105 instruction templates and memory access 1120 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1150—its content distinguishes which one of a variety of different operations to be performed in addition to the base operation. This field is context specific. In one embodiment of the invention, this field is divided into a class field 1168, an alpha field 1152, and a beta field 1154. The augmentation operation field 1150 allows common groups of operations to be performed in a single instruction rather than 2, 3, or 4 instructions.

Scale field 1160—its content allows for the scaling of the index field's content for memory address generation (e.g., for address generation that uses $2^{scale}*\text{index}+\text{base}$).

Displacement Field 1162A—its content is used as part of memory address generation (e.g., for address generation that uses $2^{scale}*\text{index}+\text{base}+\text{displacement}$).

Displacement Factor Field 1162B (note that the juxtaposition of displacement field 1162A directly over displacement factor field 1162B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1174 (described later herein) and the data manipulation field 1154C. The displacement field 1162A and the displacement factor field 1162B are optional in the sense that they are not used for the no memory access 1105 instruction templates and/or different embodiments may implement only one or none of the two.

Data element width field 1164—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1170—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1170 allows for partial vector operations, including loads, stores, arithmetic, logical, etc. While embodiments of the invention are described in which the write mask field's 1170 content selects one of a number of write mask registers that contains the write mask to be used (and thus the write mask field's 1170 content indirectly identifies that masking to be performed), alternative embodiments instead or additional allow the mask write field's 1170 content to directly specify the masking to be performed.

Immediate field 1172—its content allows for the specification of an immediate. This field is optional in the sense that is it not present in an implementation of the generic vector friendly format that does not support immediate and it is not present in instructions that do not use an immediate.

Class field 1168—its content distinguishes between different classes of instructions. With reference to FIGS. 11A-B, the contents of this field select between class A and class B instructions. In FIGS. 11A-B, rounded corner squares are used to indicate a specific value is present in a field (e.g., class A 1168A and class B 1168B for the class field 1168 respectively in FIGS. 11A-B).

Instruction Templates of Class A

In the case of the non-memory access 1105 instruction templates of class A, the alpha field 1152 is interpreted as an RS field 1152A, whose content distinguishes which one of the different augmentation operation types are to be performed (e.g., round 1152A.1 and data transform 1152A.2 are respectively specified for the no memory access, round type operation 1110 and the no memory access, data transform type operation 1115 instruction templates), while the beta field 1154 distinguishes which of the operations of the specified type is to be performed. In the no memory access 1105 instruction templates, the scale field 1160, the displacement field 1162A, and the displacement scale filed 1162B are not present.

No-Memory Access Instruction Templates—Full Round Control Type Operation

In the no memory access full round control type operation 1110 instruction template, the beta field 1154 is interpreted as a round control field 1154A, whose content(s) provide static rounding. While in the described embodiments of the invention the round control field 1154A includes a suppress all floating point exceptions (SAE) field 1156 and a round operation control field 1158, alternative embodiments may support may encode both these concepts into the same field or only have one or the other of these concepts/fields (e.g., may have only the round operation control field 1158).

SAE field 1156—its content distinguishes whether or not to disable the exception event reporting; when the SAE field's 1156 content indicates suppression is enabled, a given instruction does not report any kind of floating-point exception flag and does not raise any floating point exception handler.

Round operation control field 1158—its content distinguishes which one of a group of rounding operations to perform (e.g., Round-up, Round-down, Round-towards-zero and Round-to-nearest). Thus, the round operation control field 1158 allows for the changing of the rounding mode on a per instruction basis. In one embodiment of the invention where a processor includes a control register for specifying rounding modes, the round operation control field's 1150 content overrides that register value.

No Memory Access Instruction Templates—Data Transform Type Operation

In the no memory access data transform type operation 1115 instruction template, the beta field 1154 is interpreted as a data transform field 1154B, whose content distinguishes which one of a number of data transforms is to be performed (e.g., no data transform, swizzle, broadcast).

In the case of a memory access 1120 instruction template of class A, the alpha field 1152 is interpreted as an eviction hint field 1152B, whose content distinguishes which one of the eviction hints is to be used (in FIG. 11A, temporal 1152B.1 and non-temporal 1152B.2 are respectively specified for the memory access, temporal 1125 instruction template and the memory access, non-temporal 1130 instruction template), while the beta field 1154 is interpreted as a data manipulation field 1154C, whose content distinguishes which one of a number of data manipulation operations (also known as primitives) is to be performed (e.g., no manipulation; broadcast; up conversion of a source; and down conversion of a destination). The memory access 1120 instruction templates include the scale field 1160, and optionally the displacement field 1162A or the displacement scale field 1162B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1152 is interpreted as a write mask control (Z) field 1152C, whose content distinguishes whether the write masking controlled by the write mask field 1170 should be a merging or a zeroing.

In the case of the non-memory access 1105 instruction templates of class B, part of the beta field 1154 is interpreted as an RL field 1157A, whose content distinguishes which one of the different augmentation operation types are to be performed (e.g., round 1157A.1 and vector length (VSIZE) 1157A.2 are respectively specified for the no memory access, write mask control, partial round control type operation 1112 instruction template and the no memory access, write mask control, VSIZE type operation 1117 instruction template), while the rest of the beta field 1154 distinguishes which of the operations of the specified type is to be performed. In the no memory access 1105 instruction templates, the scale field 1160, the displacement field 1162A, and the displacement scale filed 1162B are not present.

In the no memory access, write mask control, partial round control type operation 1110 instruction template, the rest of the beta field 1154 is interpreted as a round operation field 1159A and exception event reporting is disabled (a given instruction does not report any kind of floating-point exception flag and does not raise any floating point exception handler).

Round operation control field 1159A—just as round operation control field 1158, its content distinguishes which one of a group of rounding operations to perform (e.g., Round-up, Round-down, Round-towards-zero and Round-to-nearest). Thus, the round operation control field 1159A allows for the changing of the rounding mode on a per instruction basis. In one embodiment of the invention where a processor includes a control register for specifying rounding modes, the round operation control field's 1150 content overrides that register value.

In the no memory access, write mask control, VSIZE type operation 1117 instruction template, the rest of the beta field 1154 is interpreted as a vector length field 1159B, whose content distinguishes which one of a number of data vector lengths is to be performed on (e.g., 128, 256, or 512 byte).

In the case of a memory access 1120 instruction template of class B, part of the beta field 1154 is interpreted as a broadcast field 1157B, whose content distinguishes whether or not the broadcast type data manipulation operation is to be performed, while the rest of the beta field 1154 is interpreted the vector length field 1159B. The memory access 1120 instruction templates include the scale field 1160, and optionally the displacement field 1162A or the displacement scale field 1162B.

With regard to the generic vector friendly instruction format 1100, a full opcode field 1174 is shown including the format field 1140, the base operation field 1142, and the data element width field 1164. While one embodiment is shown where the full opcode field 1174 includes all of these fields, the full opcode field 1174 includes less than all of these fields in embodiments that do not support all of them. The full opcode field 1174 provides the operation code (opcode).

The augmentation operation field 1150, the data element width field 1164, and the write mask field 1170 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 12 is a block diagram illustrating an exemplary specific vector friendly instruction format according to embodiments of the invention. FIG. 12 shows a specific vector friendly instruction format 1200 that is specific in the sense that it specifies the location, size, interpretation, and order of the fields, as well as values for some of those fields. The specific vector friendly instruction format 1200 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 11 into which the fields from FIG. 12 map are illustrated.

It should be understood that, although embodiments of the invention are described with reference to the specific vector friendly instruction format 1200 in the context of the generic vector friendly instruction format 1100 for illustrative purposes, the invention is not limited to the specific vector friendly instruction format 1200 except where claimed. For example, the generic vector friendly instruction format 1100 contemplates a variety of possible sizes for the various fields, while the specific vector friendly instruction format 1200 is shown as having fields of specific sizes. By way of specific example, while the data element width field 1164 is illustrated as a one bit field in the specific vector friendly instruction format 1200, the invention is not so limited (that is, the generic vector friendly instruction format 1100 contemplates other sizes of the data element width field 1164).

The generic vector friendly instruction format 1100 includes the following fields listed below in the order illustrated in FIG. 12A.

EVEX Prefix (Bytes 0-3) 1202—is encoded in a four-byte form.

Format Field 1140 (EVEX Byte 0, bits [7:0])—the first byte (EVEX Byte 0) is the format field 1140 and it contains 0x62 (the unique value used for distinguishing the vector friendly instruction format in one embodiment of the invention).

The second-fourth bytes (EVEX Bytes 1-3) include a number of bit fields providing specific capability.

REX field 1205 (EVEX Byte 1, bits [7-5])—consists of a EVEX.R bit field (EVEX Byte 1, bit [7]-R), EVEX.X bit field (EVEX byte 1, bit [6]—X), and 1157BEX byte 1, bit[5]-B). The EVEX.R, EVEX.X, and EVEX.B bit fields provide the same functionality as the corresponding VEX bit fields, and are encoded using is complement form, i.e. ZMM0 is encoded as 1011B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1110—this is the first part of the REX' field 1110 and is the EVEX.R' bit field (EVEX Byte 1, bit [4]-R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1215 (EVEX byte 1, bits [3:0]-mmmm)—its content encodes an implied leading opcode byte (0F, 0F 38, or 0F 3).

Data element width field 1164 (EVEX byte 2, bit [7]-W)—is represented by the notation EVEX.W. EVEX.W is used to define the granularity (size) of the datatype (either 32-bit data elements or 64-bit data elements).

EVEX.vvvv 1220 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in is complement form for certain vector shifts; or 3) EVEX.vvvv does not encode any operand, the field is reserved and should contain 1011b. Thus, EVEX.vvvv field 1220 encodes the 4 low-order bits of the first source register specifier stored in inverted (1s complement) form. Depending on the instruction, an extra different EVEX bit field is used to extend the specifier size to 32 registers.

EVEX.U 1168 Class field (EVEX byte 2, bit [2]-U)—If EVEX.U=0, it indicates class A or EVEX.U0; if EVEX.U=1, it indicates class B or EVEX.U1.

Prefix encoding field 1225 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1152 (EVEX byte 3, bit [7]-EH; also known as EVEX.EH, EVEX.rs, EVEX.RL, EVEX.write mask control, and EVEX.N; also illustrated with α)—as previously described, this field is context specific.

Beta field 1154 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 1110—this is the remainder of the REX' field and is the EVEX.V' bit field (EVEX Byte 3, bit [3]-V') that may be used to encode either the upper 16 or lower 16 of the extended 32 register set. This hit is stored in bit inverted format. A value of 1 is used to encode the lower 16 registers. In other words, V'VVVV is formed by combining EVEX.V', EVEX.vvvv.

Write mask field 1170 (EVEX byte 3, bits [2:0]-kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1230 (Byte 4) is also known as the opcode byte. Part of the opcode is specified in this field.

MOD R/M Field 1240 (Byte 5) includes MOD field 1242, Reg field 1244, and R/M field 1246. As previously described, the MOD field's 1242 content distinguishes between memory access and non-memory access operations. The role of Reg field 1244 can be summarized to two situations: encoding either the destination register operand or a source register operand, or be treated as an opcode extension and not used to encode any instruction operand. The role of R/M field 1246 may include the following: encoding the instruction operand that references a memory address, or encoding either the destination register operand or a source register operand.

Scale, Index, Base (SIB) Byte (Byte 6)—As previously described, the scale field's 1150 content is used for memory address generation. SIB.xxx 1254 and SIB.bbb 1256—the contents of these fields have been previously referred to with regard to the register indexes Xxxx and Bbbb.

Displacement field 1162A (Bytes 7-10)—when MOD field 1242 contains 10, bytes 7-10 are the displacement field 1162A, and it works the same as the legacy 32-bit displacement (disp32) and works at byte granularity.

Displacement factor field 1162B (Byte 7)—when MOD field 1242 contains 01, byte 7 is the displacement factor field 1162B. The location of this field is that same as that of the legacy x86 instruction set 8-bit displacement (disp8), which works at byte granularity. Since disp8 is sign extended, it can only address between −128 and 117 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1162B is a reinterpretation of disp8; when using displacement factor field 1162B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1162B substitutes the legacy x86 instruction set 8-bit displacement. Thus, the displacement factor field 1162B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset).

Immediate field 1172 operates as previously described.

Full Opcode Field

FIG. 12B is a block diagram illustrating the fields of the specific vector friendly instruction format 1200 that make up the full opcode field 1174 according to one embodiment of the invention. Specifically, the full opcode field 1174 includes the format field 1140, the base operation field 1142, and the data element width (W) field 1164. The base operation field 1142 includes the prefix encoding field 1225, the opcode map field 1215, and the real opcode field 1230.

Register Index Field

FIG. 12C is a block diagram illustrating the fields of the specific vector friendly instruction format 1200 that make up the register index field 1144 according to one embodiment of the invention. Specifically, the register index field 1144 includes the REX field 1205, the REX' field 1210, the MODR/M.reg field 1244, the MODR/M.r/m field 1246, the VVVV field 1220, xxx field 1254, and the bbb field 1256.

Augmentation Operation Field

Figure 12D:
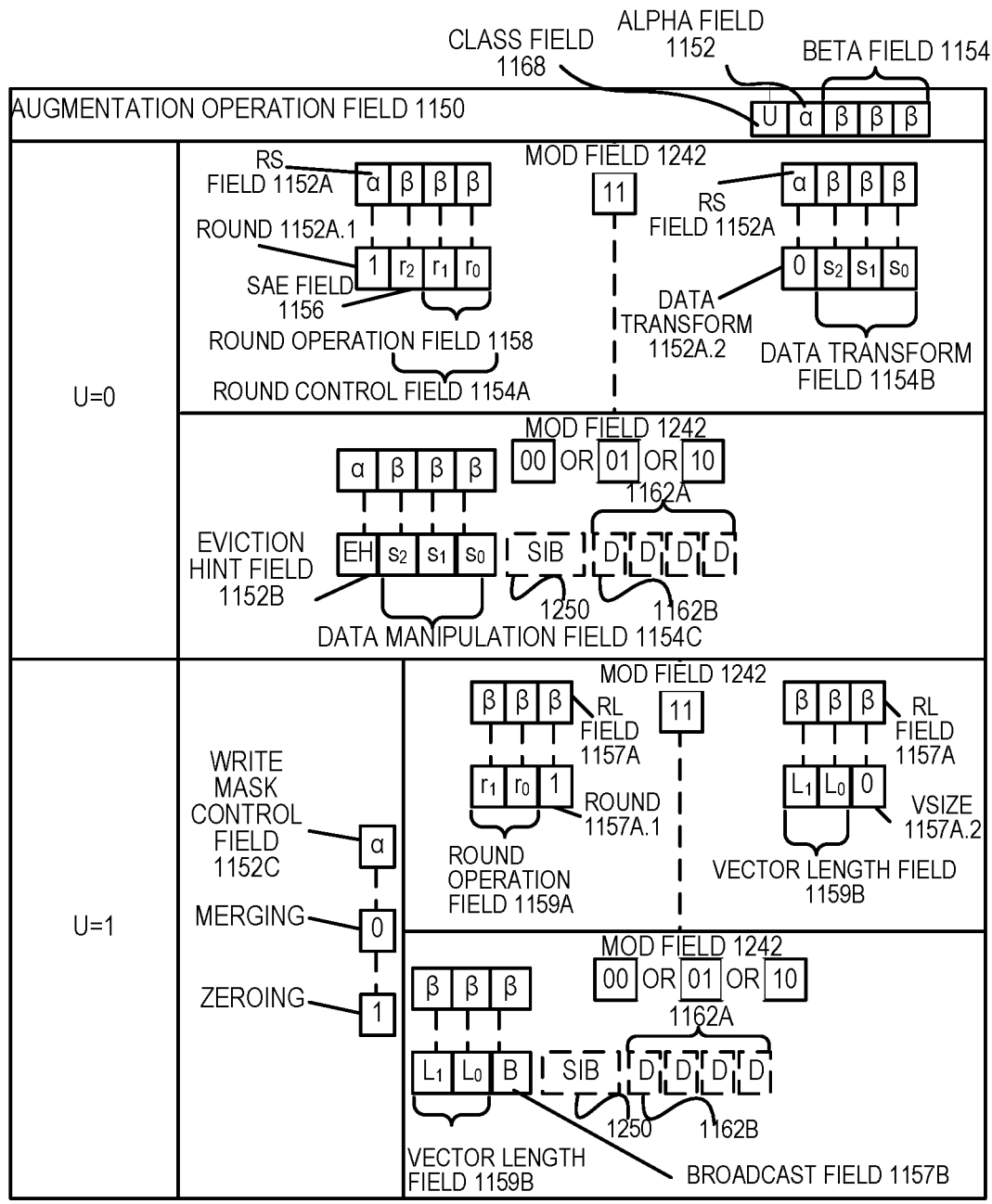

FIG. 12D is a block diagram illustrating the fields of the specific vector friendly instruction format 1200 that make up the augmentation operation field 1150 according to one embodiment of the invention. When the class (U) field 1168 contains 0, it signifies EVEX.U0 (class A 1168A); when it contains 1, it signifies EVEX.U1 (class B 1168B). When U=0 and the MOD field 1242 contains 11 (signifying a no memory access operation), the alpha field 1152 (EVEX byte 3, bit [7]-EH) is interpreted as the rs field 1152A. When the rs field 1152A contains a 1 (round 1152A.1), the beta field 1154 (EVEX byte 3, bits [6:4]-SSS) is interpreted as the round control field 1154A. The round control field 1154A includes a one bit SAE field 1156 and a two bit round operation field 1158. When the rs field 1152A contains a 0 (data transform 1152A.2), the beta field 1154 (EVEX byte 3, bits [6:4]-SSS) is interpreted as a three bit data transform field 1154B. When U=0 and the MOD field 1242 contains 00, 01, or 10 (signifying a memory access operation), the alpha field 1152 (EVEX byte 3, bit [7]-EH) is interpreted as the eviction hint (EH) field 1152B and the beta field 1154 (EVEX byte 3, bits [6:4]-SSS) is interpreted as a three bit data manipulation field 1154C.

When U=1, the alpha field 1152 (EVEX byte 3, bit [7]-EH) is interpreted as the write mask control (Z) field 1152C. When U=1 and the MOD field 1242 contains 11 (signifying a no memory access operation), part of the beta field 1154 (EVEX byte 3, bit [4]-$S_0$) is interpreted as the RL field 1157A; when it contains a 1 (round 1157A.1) the rest of the beta field 1154 (EVEX byte 3, bit [6-5]-$S_{2-1}$) is interpreted as the round operation field 1159A, while when the RL field 1157A contains a 0 (VSIZE 1157.A2) the rest of the beta field 1154 (EVEX byte 3, bit [6-5]-$S_{2-1}$) is interpreted as the vector length field 1159B (EVEX byte 3, bit [6-5]-$L_{1-0}$). When U=1 and the MOD field 1242 contains 00, 01, or 10 (signifying a memory access operation), the beta field 1154 (EVEX byte 3, bits [6:4]-SSS) is interpreted as the vector length field 1159B (EVEX byte 3, bit [6-5]-$L_{1-0}$) and the broadcast field 1157B (EVEX byte 3, bit [4]-B).

Exemplary Register Architecture

Figure 13:
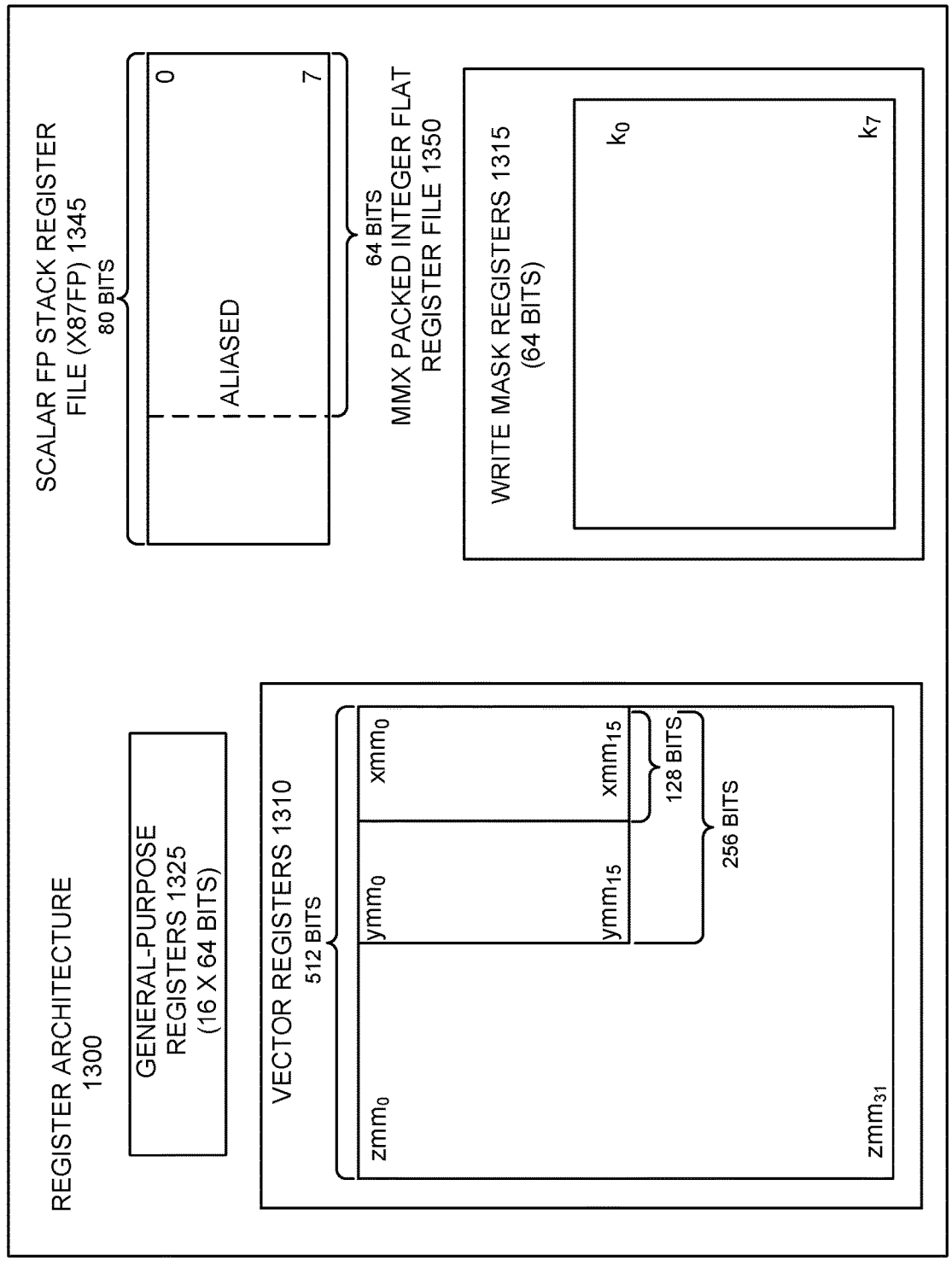
FIG. 13 is a block diagram of an embodiment of a register architecture.

FIG. 13 is a block diagram of a register architecture 1300 according to one embodiment of the invention. In the embodiment illustrated, there are 32 vector registers 1310 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1200 operates on these overlaid register file as illustrated in the below tables.

| Adjustable Vector Length | Class | Operations | Registers |
|---|---|---|---|
| Instruction Templates that do not include the vector length field 1159B | A (FIG. 11A; U = 0) | 1110, 1115, 1125, 1130 | zmm registers (the vector length is 64 byte) |
| | B (FIG. 11B; U = 1) | 1112 | zmm registers (the vector length is 64 byte) |
| Instruction templates that do include the vector length field 1159B | B (FIG. 11B; U = 1) | 1117, 1127 | zmm, ymm, or xmm registers (the vector length is 64 byte, 32 byte, or 16 byte) depending on the vector length field 1159B |

In other words, the vector length field 1159B selects between a maximum length and one or more other shorter lengths, where each such shorter length is half the length of the preceding length; and instructions templates without the vector length field 1159B operate on the maximum vector length. Further, in one embodiment, the class B instruction templates of the specific vector friendly instruction format 1200 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1315—in the embodiment illustrated, there are 8 write mask registers (k0 through k7), each 64 bits in size. In an alternate embodiment, the write mask registers 1315 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1325—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1345, on which is aliased the MMX packed integer flat register file 1350—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 14A is a block diagram illustrating both an exemplary in-order pipeline and an exemplary register renaming, out-of-order issue/execution pipeline according to embodiments of the invention. FIG. 14B is a block diagram illustrating both an exemplary embodiment of an in-order architecture core and an exemplary register renaming, out-of-order issue/execution architecture core to be included in a processor according to embodiments of the invention. The solid lined boxes in FIGS. 14A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 14A, a processor pipeline 1400 includes a fetch stage 1402, a length decode stage 1404, a decode stage 1406, an allocation stage 1408, a renaming stage 1410, a scheduling (also known as a dispatch or issue) stage 1412, a register read/memory read stage 1414, an execute stage 1416, a write back/memory write stage 1418, an exception handling stage 1422, and a commit stage 1424.

FIG. 14B shows processor core 1490 including a front end unit 1430 coupled to an execution engine unit 1450, and both are coupled to a memory unit 1470. The core 1490 may be a reduced instruction set computing (RISC) core, a complex instruction set computing (CISC) core, a very long instruction word (VLIW) core, or a hybrid or alternative core type. As yet another option, the core 1490 may be a special-purpose core, such as, for example, a network or communication core, compression engine, coprocessor core, general purpose computing graphics processing unit (GPGPU) core, graphics core, or the like.

The front end unit 1430 includes a branch prediction unit 1432 coupled to an instruction cache unit 1434, which is coupled to an instruction translation lookaside buffer (TLB) 1436, which is coupled to an instruction fetch unit 1438, which is coupled to a decode unit 1440. The decode unit 1440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1490 includes a microcode ROM or other medium that stores microcode for certain macroinstructions (e.g., in decode unit 1440 or otherwise within the front end unit 1430). The decode unit 1440 is coupled to a rename/allocator unit 1452 in the execution engine unit 1450.

The execution engine unit 1450 includes the rename/allocator unit 1452 coupled to a retirement unit 1454 and a set of one or more scheduler unit(s) 1456. The scheduler unit(s) 1456 represents any number of different schedulers, including reservations stations, central instruction window, etc. The scheduler unit(s) 1456 is coupled to the physical register file(s) unit(s) 1458. Each of the physical register file(s) units 1458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1458 comprises a vector registers unit, a write mask registers unit, and a scalar registers unit. These register units may provide architectural vector registers, vector mask registers, and general purpose registers. The physical register file(s) unit(s) 1458 is overlapped by the retirement unit 1454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1454 and the physical register file(s) unit(s) 1458 are coupled to the execution cluster(s) 1460. The execution cluster(s) 1460 includes a set of one or more execution units 1462 and a set of one or more memory access units 1464. The execution units 1462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1456, physical register file(s) unit(s) 1458, and execution cluster(s) 1460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1464). It should also be understood that where separate pipelines are used, one or more of these pipelines may be out-of-order issue/execution and the rest in-order.

The set of memory access units 1464 is coupled to the memory unit 1470, which includes a data TLB unit 1472 coupled to a data cache unit 1474 coupled to a level 2 (L2) cache unit 1476. In one exemplary embodiment, the memory access units 1464 may include a load unit, a store address unit, and a store data unit, each of which is coupled to the data TLB unit 1472 in the memory unit 1470. The instruction cache unit 1434 is further coupled to a level 2 (L2) cache unit 1476 in the memory unit 1470. The L2 cache unit 1476 is coupled to one or more other levels of cache and eventually to a main memory.

By way of example, the exemplary register renaming, out-of-order issue/execution core architecture may implement the pipeline 1400 as follows: 1) the instruction fetch 1438 performs the fetch and length decoding stages 1402 and 1404; 2) the decode unit 1440 performs the decode stage 1406; 3) the rename/allocator unit 1452 performs the allocation stage 1408 and renaming stage 1410; 4) the scheduler unit(s) 1456 performs the schedule stage 1412; 5) the physical register file(s) unit(s) 1458 and the memory unit 1470 perform the register read/memory read stage 1414; the execution cluster 1460 perform the execute stage 1416; 6) the memory unit 1470 and the physical register file(s) unit(s) 1458 perform the write back/memory write stage 1418; 7) various units may be involved in the exception handling stage 1422; and 8) the retirement unit 1454 and the physical register file(s) unit(s) 1458 perform the commit stage 1424.

The core 1490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1434/1474 and a shared L2 cache unit 1476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 15B:
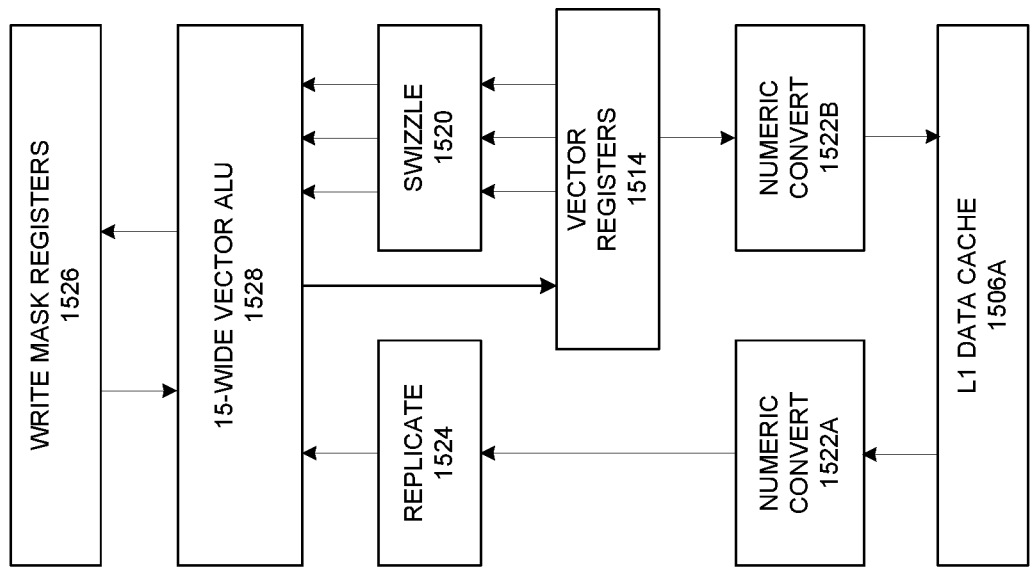
FIG. 15B is a block diagram of an embodiment of an expanded view of part of the processor core of FIG. 15A.
Figure 15A:
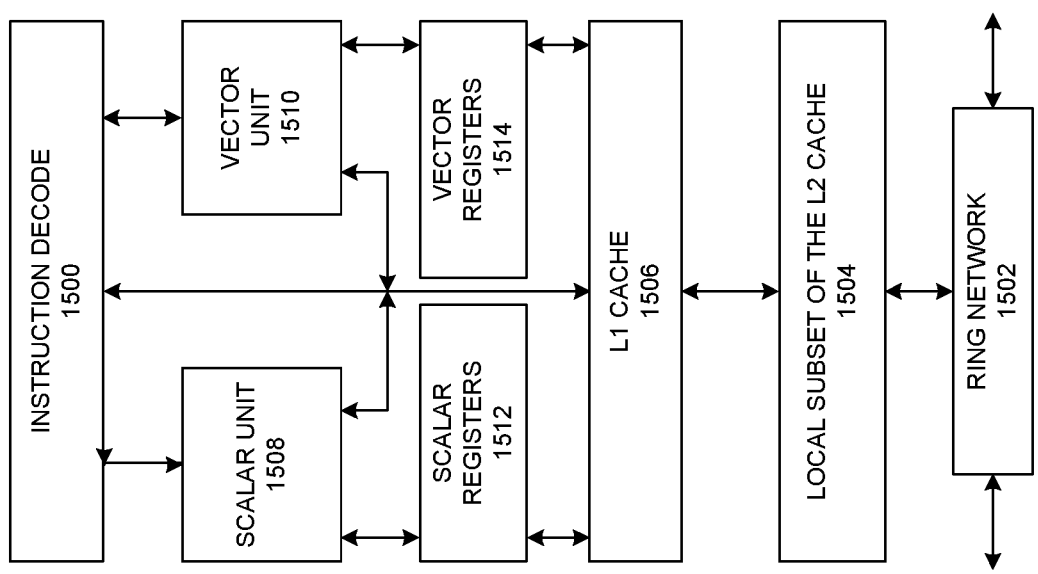
FIG. 15A is a block diagram of an embodiment of a single processor core, along with its connection to the on-die interconnect network, and with its local subset of the Level 2 (L2) cache.

FIGS. 15A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 15A is a block diagram of a single processor core, along with its connection to the on-die interconnect network 1502 and with its local subset of the Level 2 (L2) cache 1504, according to embodiments of the invention. In one embodiment, an instruction decoder 1500 supports the x86 instruction set with a packed data instruction set extension. An L1 cache 1506 allows low-latency accesses to cache memory into the scalar and vector units. While in one embodiment (to simplify the design), a scalar unit 1508 and a vector unit 1510 use separate register sets (respectively, scalar registers 11512 and vector registers 1514) and data transferred between them is written to memory and then read back in from a level 1 (L1) cache 1506, alternative embodiments of the invention may use a different approach (e.g., use a single register set or include a communication path that allow data to be transferred between the two register files without being written and read back).

The local subset of the L2 cache 1504 is part of a global L2 cache that is divided into separate local subsets, one per processor core. Each processor core has a direct access path to its own local subset of the L2 cache 1504. Data read by a processor core is stored in its L2 cache subset 1504 and can be accessed quickly, in parallel with other processor cores accessing their own local L2 cache subsets. Data written by a processor core is stored in its own L2 cache subset 1504 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 15B is an expanded view of part of the processor core in FIG. 15A according to embodiments of the invention. FIG. 15B includes an L1 data cache 1506A part of the L1 cache 1504, as well as more detail regarding the vector unit 1510 and the vector registers 1514. Specifically, the vector unit 1510 is a 16-wide vector processing unit (VPU) (see the 16-wide ALU 1528), which executes one or more of integer, single-precision float, and double-precision float instructions. The VPU supports swizzling the register inputs with swizzle unit 1520, numeric conversion with numeric convert units 1522A-B, and replication with replication unit 1524 on the memory input. Write mask registers 1526 allow predicating resulting vector writes.

Processor with Integrated Memory Controller and Graphics

Figure 16:
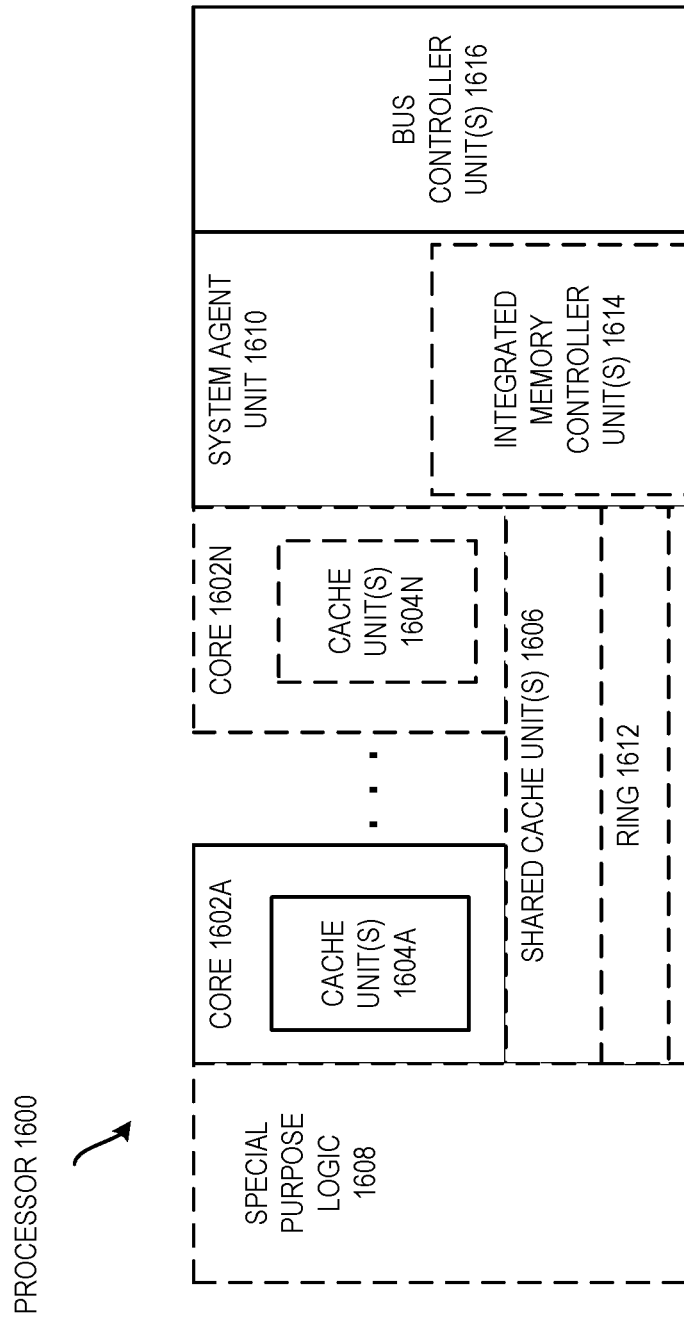
FIG. 16 is a block diagram of an embodiment of a processor that may have more than one core, may have an integrated memory controller, and may have integrated graphics.

FIG. 16 is a block diagram of a processor 1600 that may have more than one core, may have an integrated memory controller, and may have integrated graphics according to embodiments of the invention. The solid lined boxes in FIG. 16 illustrate a processor 1600 with a single core 1602A, a system agent 1610, a set of one or more bus controller units 1616, while the optional addition of the dashed lined boxes illustrates an alternative processor 1600 with multiple cores 1602A-N, a set of one or more integrated memory controller unit(s) 1614 in the system agent unit 1610, and special purpose logic 1608.

Thus, different implementations of the processor 1600 may include: 1) a CPU with the special purpose logic 1608 being integrated graphics and/or scientific (throughput) logic (which may include one or more cores), and the cores 1602A-N being one or more general purpose cores (e.g., general purpose in-order cores, general purpose out-of-order cores, a combination of the two); 2) a coprocessor with the cores 1602A-N being a large number of special purpose cores intended primarily for graphics and/or scientific (throughput); and 3) a coprocessor with the cores 1602A-N being a large number of general purpose in-order cores. Thus, the processor 1600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1600 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1606, and external memory (not shown) coupled to the set of integrated memory controller units 1614. The set of shared cache units 1606 may include one or more mid-level caches, such as level 2 (L2), level 3 (L3), level 4 (L4), or other levels of cache, a last level cache (LLC), and/or combinations thereof. While in one embodiment a ring based interconnect unit 1612 interconnects the integrated graphics logic 1608, the set of shared cache units 1606, and the system agent unit 1610/integrated memory controller unit(s) 1614, alternative embodiments may use any number of well-known techniques for interconnecting such units. In one embodiment, coherency is maintained between one or more cache units 1606 and cores 1602-A-N.

In some embodiments, one or more of the cores 1602A-N are capable of multithreading. The system agent 1610 includes those components coordinating and operating cores 1602A-N. The system agent unit 1610 may include for example a power control unit (PCU) and a display unit. The PCU may be or include logic and components needed for regulating the power state of the cores 1602A-N and the integrated graphics logic 1608. The display unit is for driving one or more externally connected displays.

The cores 1602A-N may be homogenous or heterogeneous in terms of architecture instruction set; that is, two or more of the cores 1602A-N may be capable of execution the same instruction set, while others may be capable of executing only a subset of that instruction set or a different instruction set.

Exemplary Computer Architectures

FIGS. 17-21 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 17:
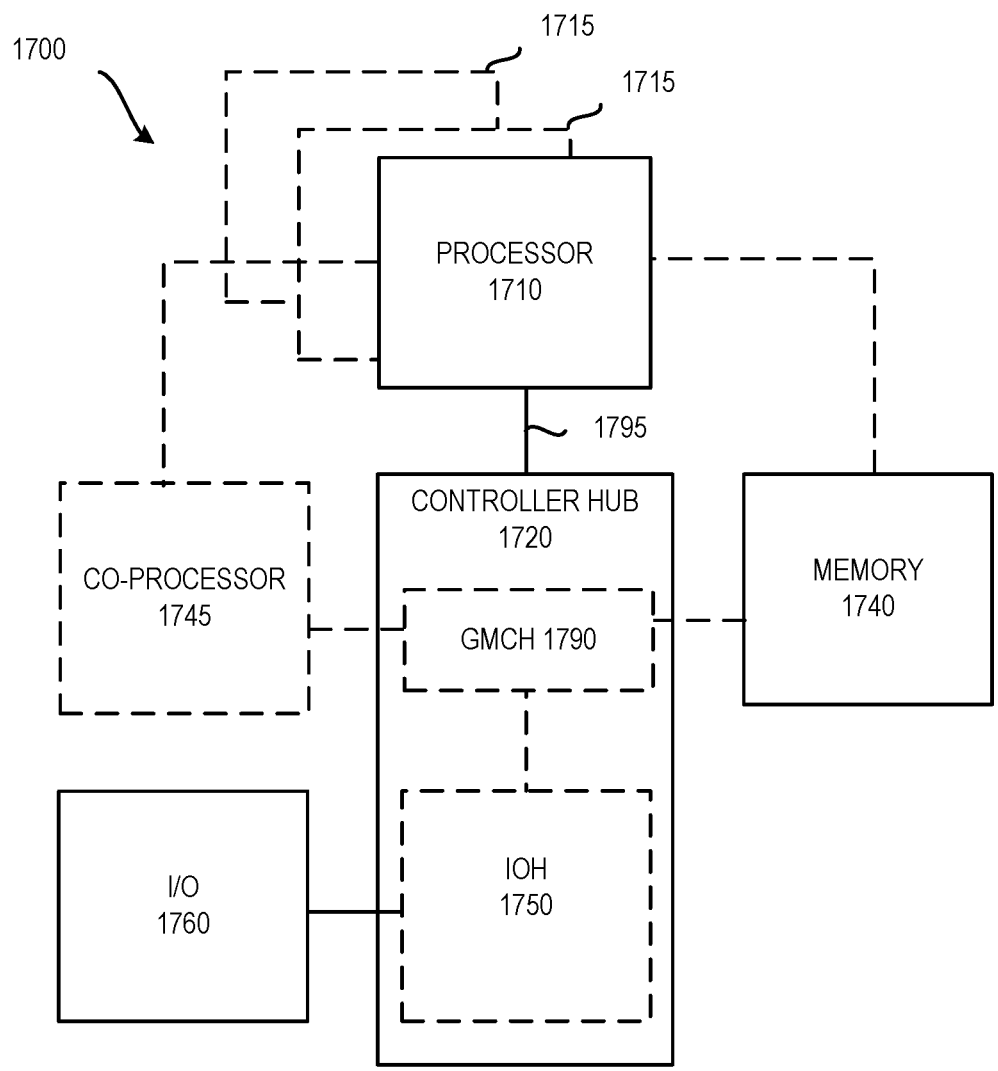
FIG. 17 is a block diagram of a first embodiment of a computer architecture.

Referring now to FIG. 17, shown is a block diagram of a system 1700 in accordance with one embodiment of the present invention. The system 1700 may include one or more processors 1710, 1715, which are coupled to a controller hub 1720. In one embodiment the controller hub 1720 includes a graphics memory controller hub (GMCH) 1790 and an Input/Output Hub (IOH) 1750 (which may be on separate chips); the GMCH 1790 includes memory and graphics controllers to which are coupled memory 1740 and a coprocessor 1745; the IOH 1750 is couples input/output (I/O) devices 1760 to the GMCH 1790. Alternatively, one or both of the memory and graphics controllers are integrated within the processor (as described herein), the memory 1740 and the coprocessor 1745 are coupled directly to the processor 1710, and the controller hub 1720 in a single chip with the IOH 1750.

The optional nature of additional processors 1715 is denoted in FIG. 17 with broken lines. Each processor 1710, 1715 may include one or more of the processing cores described herein and may be some version of the processor 1600.

The memory 1740 may be, for example, dynamic random access memory (DRAM), phase change memory (PCM), or a combination of the two. For at least one embodiment, the controller hub 1720 communicates with the processor(s) 1710, 1715 via a multi-drop bus, such as a frontside bus (FSB), point-to-point interface such as QuickPath Interconnect (QPI), or similar connection 1795.

In one embodiment, the coprocessor 1745 is a special-purpose processor, such as, for example, a high-throughput MIC processor, a network or communication processor, compression engine, graphics processor, GPGPU, embedded processor, or the like. In one embodiment, controller hub 1720 may include an integrated graphics accelerator.

There can be a variety of differences between the physical resources 1710, 1715 in terms of a spectrum of metrics of merit including architectural, microarchitectural, thermal, power consumption characteristics, and the like.

In one embodiment, the processor 1710 executes instructions that control data processing operations of a general type. Embedded within the instructions may be coprocessor instructions. The processor 1710 recognizes these coprocessor instructions as being of a type that should be executed by the attached coprocessor 1745. Accordingly, the processor 1710 issues these coprocessor instructions (or control signals representing coprocessor instructions) on a coprocessor bus or other interconnect, to coprocessor 1745. Coprocessor(s) 1745 accept and execute the received coprocessor instructions.

Figure 18:
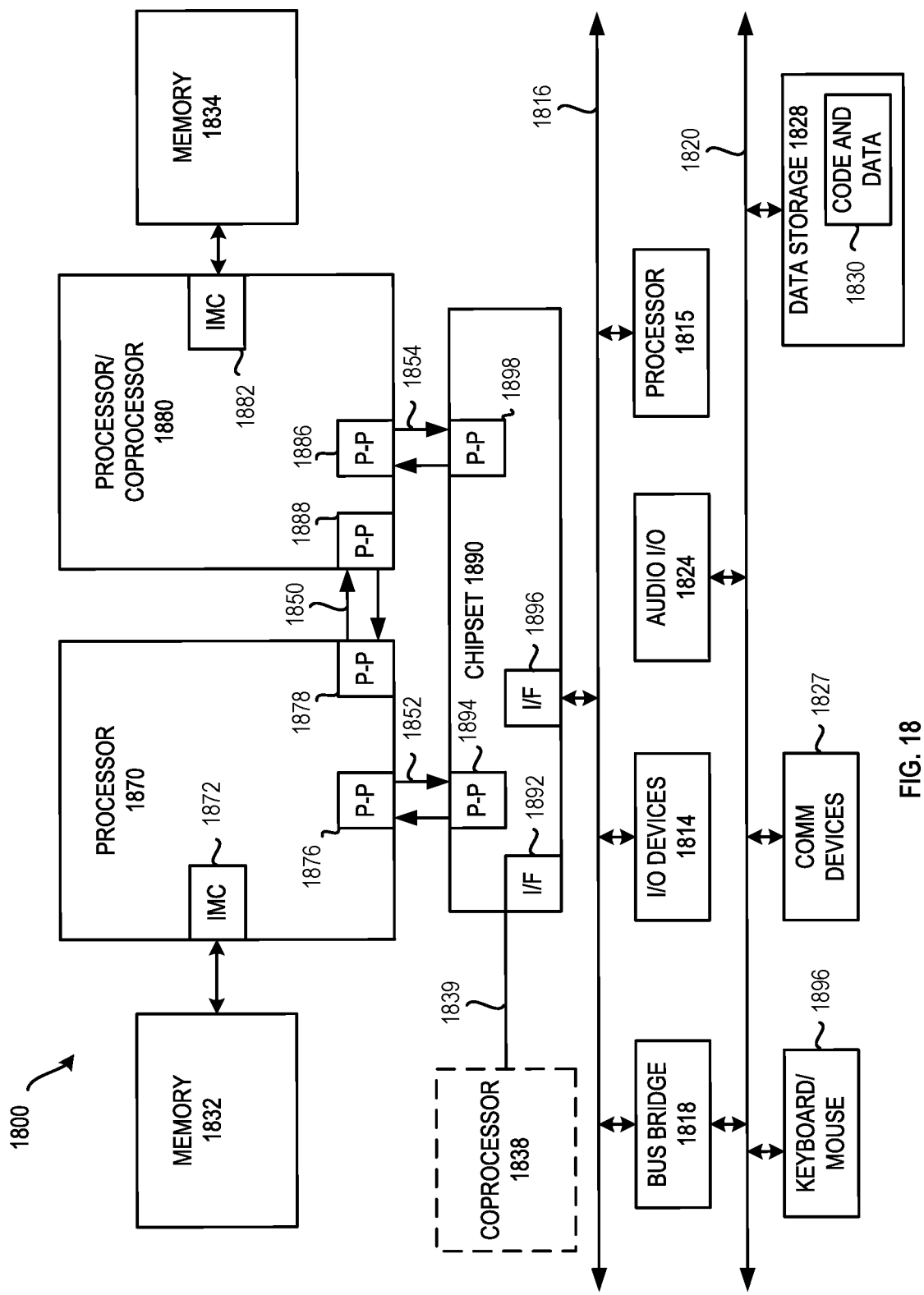
FIG. 18 is a block diagram of a second embodiment of a computer architecture.

Referring now to FIG. 18, shown is a block diagram of a first more specific exemplary system 1800 in accordance with an embodiment of the present invention. As shown in FIG. 18, multiprocessor system 1800 is a point-to-point interconnect system, and includes a first processor 1870 and a second processor 1880 coupled via a point-to-point interconnect 1850. Each of processors 1870 and 1880 may be some version of the processor 1600. In one embodiment of the invention, processors 1870 and 1880 are respectively processors 1710 and 1715, while coprocessor 1838 is coprocessor 1745. In another embodiment, processors 1870 and 1880 are respectively processor 1710 coprocessor 1745.

Processors 1870 and 1880 are shown including integrated memory controller (IMC) units 1872 and 1882, respectively. Processor 1870 also includes as part of its bus controller units point-to-point (P-P) interfaces 1876 and 1878; similarly, second processor 1880 includes P-P interfaces 1886 and 1888. Processors 1870, 1880 may exchange information via a point-to-point (P-P) interface 1850 using P-P interface circuits 1878, 1888. As shown in FIG. 18, IMCs 1872 and 1882 couple the processors to respective memories, namely a memory 1832 and a memory 1834, which may be portions of main memory locally attached to the respective processors.

Processors 1870, 1880 may each exchange information with a chipset 1890 via individual P-P interfaces 1852, 1854 using point to point interface circuits 1876, 1894, 1886, 1898. Chipset 1890 may optionally exchange information with the coprocessor 1838 via a high-performance interface 1839. In one embodiment, the coprocessor 1838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1890 may be coupled to a first bus 1816 via an interface 1896. In one embodiment, first bus 1816 may be a Peripheral Component Interconnect (PCI) bus, or a bus such as a PCI Express bus or another third generation I/O interconnect bus, although the scope of the present invention is not so limited.

As shown in FIG. 18, various 110 devices 1814 may be coupled to first bus 1816, along with a bus bridge 1818 which couples first bus 1816 to a second bus 1820. In one embodiment, one or more additional processor(s) 1815, such as coprocessors, high-throughput MIC processors, GPGPU's, accelerators (such as, e.g., graphics accelerators or digital signal processing (DSP) units), field programmable gate arrays, or any other processor, are coupled to first bus 1816. In one embodiment, second bus 1820 may be a low pin count (LPC) bus. Various devices may be coupled to a second bus 1820 including, for example, a keyboard and/or mouse 1822, communication devices 1827 and a storage unit 1828 such as a disk drive or other mass storage device which may include instructions/code and data 1830, in one embodiment. Further, an audio I/O 1824 may be coupled to the second bus 1820. Note that other architectures are possible. For example, instead of the point-to-point architecture of FIG. 18, a system may implement a multi-drop bus or other such architecture.

Figure 19:
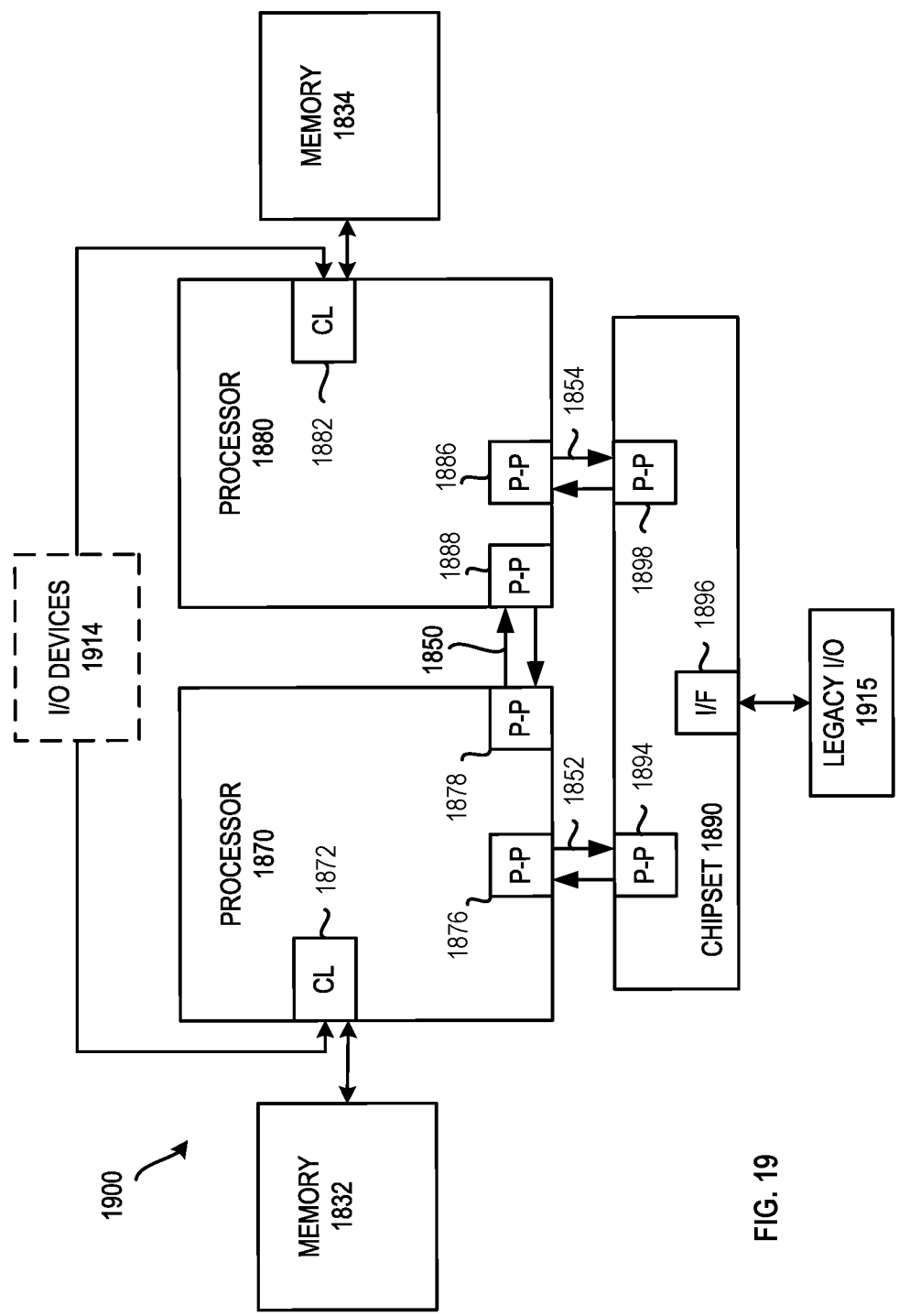
FIG. 19 is a block diagram of a third embodiment of a computer architecture.

Referring now to FIG. 19, shown is a block diagram of a second more specific exemplary system 1900 in accordance with an embodiment of the present invention. Like elements in FIGS. 18 and 19 bear like reference numerals, and certain aspects of FIG. 18 have been omitted from FIG. 19 in order to avoid obscuring other aspects of FIG. 19.

FIG. 19 illustrates that the processors 1870, 1880 may include integrated memory and I/O control logic ("CL") 1872 and 1882, respectively. Thus, the CL 1872, 1882 include integrated memory controller units and include I/O control logic. FIG. 19 illustrates that not only are the memories 1832, 1834 coupled to the CL 1872, 1882, but also that I/O devices 1914 are also coupled to the control logic 1872, 1882. Legacy 110 devices 1915 are coupled to the chipset 1890.

Figure 20:
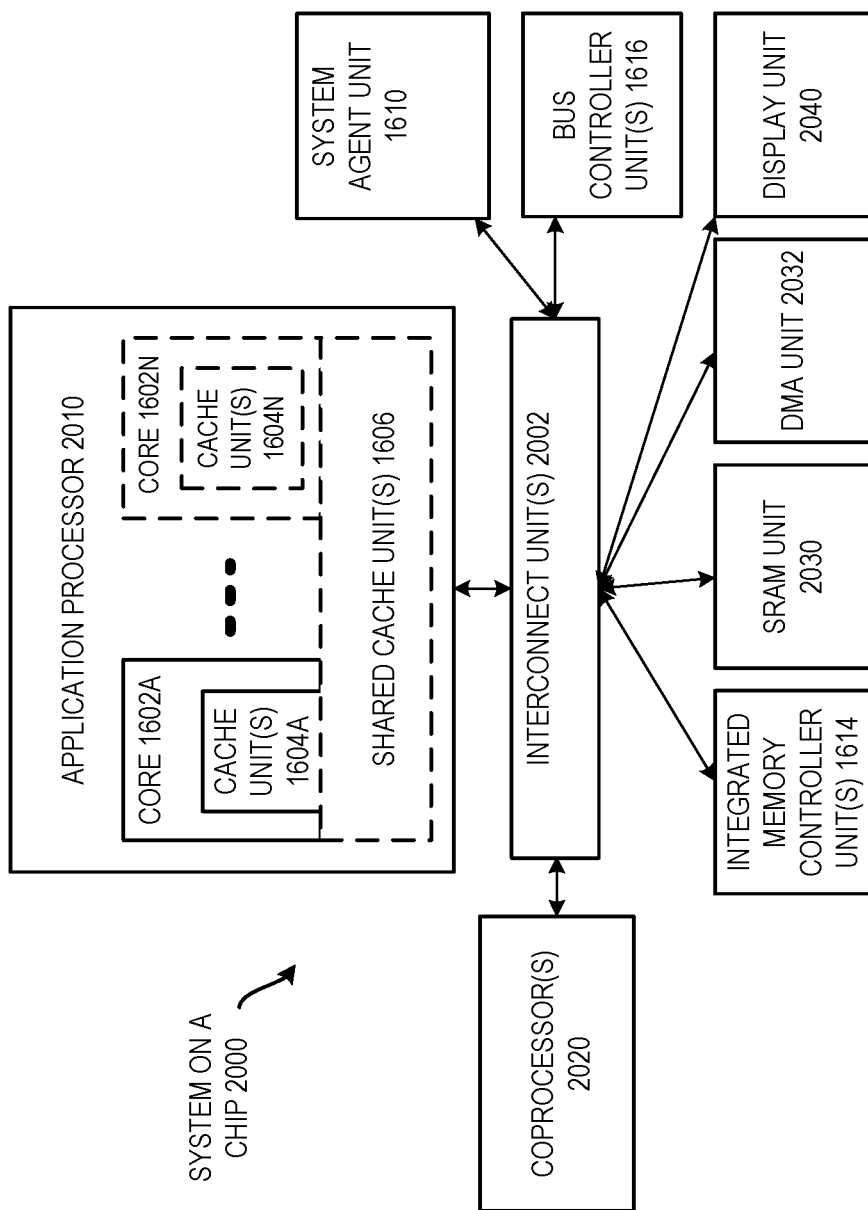
FIG. 20 is a block diagram of a fourth embodiment of a computer architecture.

Referring now to FIG. 20, shown is a block diagram of a SoC 2000 in accordance with an embodiment of the present invention. Similar elements in FIG. 16 bear like reference numerals. Also, dashed lined boxes are optional features on more advanced SoCs. In FIG. 20, an interconnect unit(s) 2002 is coupled to: an application processor 2010 which includes a set of one or more cores 192A-N and shared cache unit(s) 1606; a system agent unit 1610; a bus controller unit(s) 1616; an integrated memory controller unit(s) 1614; a set or one or more coprocessors 2020 which may include integrated graphics logic, an image processor, an audio processor, and a video processor; an static random access memory (SRAM) unit 2030; a direct memory access (DMA) unit 2032; and a display unit 2040 for coupling to one or more external displays. In one embodiment, the coprocessor(s) 2020 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1830 illustrated in FIG. 18, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 21:
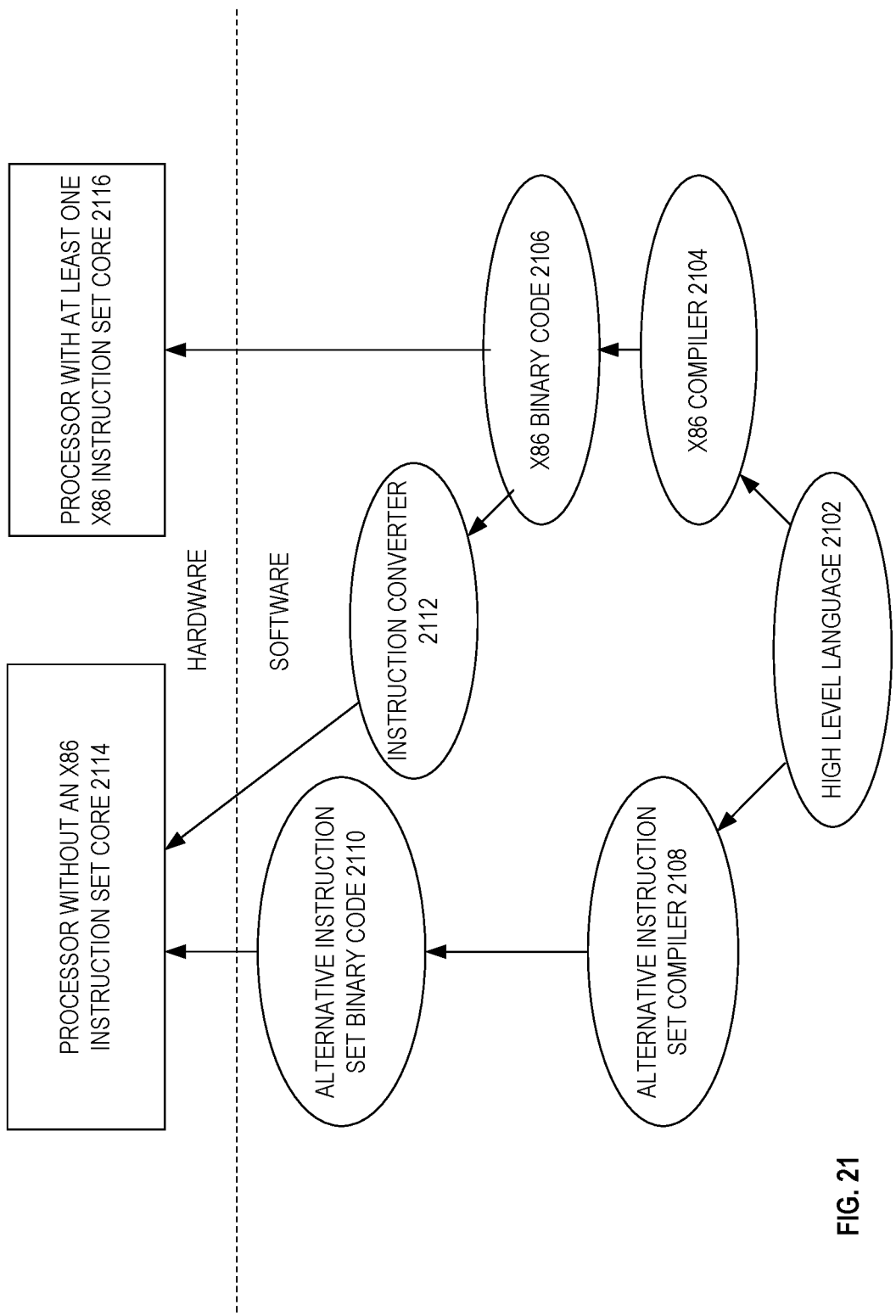
FIG. 21 is a block diagram of use of a software instruction converter to convert binary instructions in a source instruction set to binary instructions in a target instruction set, according to embodiments of the invention.

FIG. 21 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 21 shows a program in a high level language 2102 may be compiled using an x86 compiler 2104 to generate x86 binary code 2106 that may be natively executed by a processor with at least one x86 instruction set core 2116. The processor with at least one x86 instruction set core 2116 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2104 represents a compiler that is operable to generate x86 binary code 2106 (e.g., object code) that can, with or without additional linkage processing, be executed on the processor with at least one x86 instruction set core 2116. Similarly, FIG. 21 shows the program in the high level language 2102 may be compiled using an alternative instruction set compiler 2108 to generate alternative instruction set binary code 2110 that may be natively executed by a processor without at least one x86 instruction set core 2114 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2112 is used to convert the x86 binary code 2106 into code that may be natively executed by the processor without an x86 instruction set core 2114. This converted code is not likely to be the same as the alternative instruction set binary code 2110 because an instruction converter capable of this is difficult to make; however, the converted code will accomplish the general operation and be made up of instructions from the alternative instruction set. Thus, the instruction converter 2112 represents software, firmware, hardware, or a combination thereof that, through emulation, simulation or any other process, allows a processor or other electronic device that does not have an x86 instruction set processor or core to execute the x86 binary code 2106.

Components, features, and details described for any of FIGS. 1, 2A/B, and 5-9 may also optionally apply to any of FIGS. 3-4. Moreover, components, features, and details described for any of the apparatus may also optionally apply to any of the methods, which in embodiments may be performed by and/or with such apparatus. Any of the processors described herein may be included in any of the computer systems disclosed herein (e.g., FIGS. 17-20). In some embodiments, the instructions may have features or details of the instruction formats disclosed herein (e.g., in FIGS. 10-12), although this is not required.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a register and/or a decode unit through one or more intervening components. In the figures, arrows are used to show connections and couplings.

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Certain operations may be performed by hardware components, or may be embodied in machine-executable or circuit-executable instructions, that may be used to cause and/or result in a machine, circuit, or hardware component (e.g., a processor, portion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operative to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operative to cause the machine to perform and/or result in the machine performing one or operations, methods, or techniques disclosed herein.

In some embodiments, the machine-readable medium may include a non-transitory machine-readable storage medium. For example, the non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal.

Examples of suitable machines include, but are not limited to, a general-purpose processor, a special-purpose processor, a digital logic circuit, an integrated circuit, or the like. Still other examples of suitable machines include a computer system or other electronic device that includes a processor, a digital logic circuit, or an integrated circuit. Examples of such computer systems or electronic devices include, but are not limited to, desktop computers, laptop computers, notebook computers, tablet computers, netbooks, smartphones, cellular phones, servers, network devices (e.g., routers and switches.), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

EXAMPLE EMBODIMENTS

The following examples pertain to further embodiments. Specifics in the examples may be used anywhere in one or more embodiments.

Example 1 is a processor or other apparatus that includes a plurality of packed data registers, and a decode unit to decode a vector cache line write back instruction. The vector cache line write back instruction is to indicate a source packed memory indices operand that is to include a plurality of memory indices. The apparatus also includes a cache coherency system coupled with the plurality of the packed data registers and the decode unit. The cache coherency system, in response to the vector cache line write back instruction, is to cause any dirty cache lines, in any caches in a coherency domain, which are to have stored therein data for any of a plurality of memory addresses that are to be indicated by any of the memory indices of the source packed memory indices operand, to be written back toward one or more memories.

Example 2 includes processor of Example 1, in which the cache coherency system, in response to the vector cache line write back instruction, is optionally to cause invalidation of any cache lines, in said any of the caches in the coherency domain, which are to have stored therein the data for said any of the memory addresses.

Example 3 includes processor of Example 1, in which the cache coherency system, in response to the vector cache line write back instruction, is optionally to cause states of said any of the dirty cache lines, in said any of the caches in the coherency domain, which are to have stored therein the data for said any of the memory addresses, to be changed to an un-modified state.

Example 4 includes processor of any of Examples 1 to 3, in which the cache coherency system includes one or more cache controllers, in response to the vector cache line write back instruction, that are to initiate write backs toward the one or more memories, of any dirty cache lines, in any of one or more internal caches of the processor in the coherency domain, which are to have stored therein the data for said any of the memory addresses. The cache coherency system also includes a bus interface unit, in response to the vector cache line write back instruction, to transmit one or more cache line write back signals on an interconnect to cause any dirty cache lines, in any caches external to the processor in the coherency domain, which are to have stored therein the data for said any of the memory addresses, to be written back toward the one or more memories.

Example 5 includes processor of Example 4, in which the bus interface unit is to transmit the one or more cache line write back signals on the interconnect to cause said any dirty cache lines, in said any caches external to the processor in the coherency domain, which are to have stored therein data for a given memory address that is to be indicated by a given memory index, to be written back toward the one or more memories, optionally even when data for the given memory address is not to be stored in said any of the one or more internal caches of the processor.

Example 6 includes processor of any one of Examples 4 to 5, in which the bus interface unit is to transmit the one or more cache line write back signals on the interconnect to cause said any dirty cache lines, in said any caches external to the processor in the coherency domain, which are to have stored therein data for a given memory address that is to be indicated by a given memory index, to be written back toward the one or more memories, optionally regardless of states of any cache lines storing data for the given memory address in said any of the one or more internal caches of the processor.

Example 7 includes the processor of any one of Examples 1 to 6, in which the decode unit is to decode the vector cache line write back instruction that is to optionally indicate a source packed data operation mask operand that is to include a plurality of mask elements.

Example 8 includes processor of Example 7, in which the cache coherency system, in response to the vector cache line write back instruction, is to selectively cause, subject to the source packed data operation mask operand, said any dirty cache lines, in said any caches in the coherency domain, which are to have stored therein the data for said any of the memory addresses that are to be indicated by only any unmasked ones of the memory indices, which are not masked out by corresponding mask elements of the source packed data operation mask operand, to be written back toward the one or more memories.

Example 9 includes the processor of any one of Examples 1 to 8, in which the vector cache line write back instruction optionally includes a vector store indexed and vector cache line write back instruction that is to indicate a source packed data element operand that is to include a plurality of data elements that are to be stored to the one or more memories.

Example 10 includes processor of Example 9, further including an execution unit that, in response to the vector store indexed and vector cache line write back instruction, is to store each of the plurality of data elements of the source packed data element operand to a corresponding memory addresses in the one or more memories that is to be indicated by a corresponding memory index of the source packed memory indices operand.

Example 11 includes the processor of any of Examples 1 to 10, further including memory access order logic, in response to the vector cache line write back instruction, to optionally prevent all store instructions following the vector cache line write back instruction in program order from becoming globally visible until all store instructions preceding the vector cache line write back instruction become globally visible.

Example 12 includes processor of Example 11, further including a unit, in response to the vector cache line write back instruction, to optionally prevent all instructions following the vector cache line write back instruction in program order from completing until said any dirty cache lines have been written back to a persistent storage.

Example 13 includes the processor of any one of Examples 1 to 12, optionally further including a branch prediction unit to predict branches, and optionally an instruction prefetch unit coupled with the branch prediction unit, the instruction prefetch unit to prefetch instructions including the vector cache line write back instruction. The processor may optionally further include a level 1 (L1) instruction cache coupled with the instruction prefetch unit, the L1 instruction cache to store instructions, and optionally an L1 data cache to store data. The processor may optionally further include a level 2 (L2) cache to store data and instructions, and an instruction fetch unit coupled with the decode unit, the L1 instruction cache, and the L2 cache. The instruction fetch unit may fetch the vector cache line write back instruction from one of the L1 instruction cache and the L2 cache, and provide the vector cache line write back instruction to the decode unit. The processor may optionally further include a register rename unit coupled with the packed data registers to rename the packed data registers, and a scheduler to schedule one or more operations that have been decoded from the vector cache line write back instruction for execution by the cache coherency system.

Example 14 includes a method in a processor that includes receiving a vector cache line write back instruction. The vector cache line write back instruction may indicate a source packed memory indices operand having a plurality of memory indices. The method includes causing, responsive to the vector cache line write back instruction, any dirty cache lines, in any caches in a coherency domain, which store data for any of a plurality of memory addresses that are indicated by any of the memory indices of the source packed memory indices operand, to be written back toward one or more memories.

Example 15 includes method of Example 14, in which causing includes causing, responsive to the vector cache line write back instruction, optional invalidation of any cache lines, in said any of the caches in the coherency domain, which store the data for said any of the memory addresses.

Example 16 includes method of Example 14, in which causing includes causing, responsive to the vector cache line write back instruction, states of said any of the dirty cache lines, in said any of the caches in the coherency domain, which store the data for said any of the memory addresses, to optionally be changed to an un-modified state.

Example 17 includes method of any one of Examples 14 to 16, in which causing includes initiating write backs toward the one or more memories, of any dirty cache lines, in any of one or more internal caches of the processor in the coherency domain, which store the data for said any of the memory addresses. Causing may also optionally include transmitting one or more cache line write back signals on an interconnect to cause any dirty cache lines, in any caches external to the processor in the coherency domain, which store the data for said any of the memory addresses, to be written back toward the one or more memories.

Example 18 includes method of any one of Examples 14 to 17, in which receiving includes receiving the vector cache line write back instruction which is a masked instruction that optionally indicates a source packed data operation mask operand that includes a plurality of mask elements.

Example 19 includes method of any one of Examples 14 to 18, in which receiving includes receiving the vector cache line write back instruction which optionally indicates a source packed data element operand that includes a plurality of data elements, and further including optionally storing the plurality of data elements to memory locations in the one or more memories that are indicated by corresponding ones of the memory indices.

Example 20 includes method of any one of Examples 14 to 19, further including, in response to the vector cache line write back instruction, optionally preventing all store instructions following the vector cache line write back instruction in program order from becoming globally visible until all store instructions preceding the vector cache line write back instruction in the program order become globally visible.

Example 21 is a system to process instructions including an interconnect, and a processor coupled with the interconnect. The processor has an instruction set that includes a vector cache line write back instruction and a persistent commit instruction. The system also includes a persistent memory coupled with the interconnect. The persistent memory stores a set of instructions that, when executed by the processor, are to cause the processor to perform a set of operations. The set of operations include storing a plurality of data elements of a source packed data elements operand to memory addresses in the persistent memory that are to be indicated by corresponding memory indices of a source packed memory indices operand. The operations also include causing, responsive to the vector cache line write back instruction, any dirty cache lines, in any caches in a coherency domain, which are to have stored therein data for any of the memory addresses that are to be indicated by any of the memory indices of the source packed memory indices operand, which is to be indicated by the vector cache line write back instruction, to be written back toward the persistent memory. The operations also include preventing, responsive to the persistent commit instruction, all instructions following the vector cache line write back instruction in program order from completing until said any of the dirty cache lines have been written back to the persistent memory.

Example 22 includes system of Example 21, in which the vector cache line write back instruction is to indicate a source packed data operation mask operand that is to include a plurality of mask elements.

Example 23 is an article of manufacture including a non-transitory machine-readable storage medium, the non-transitory machine-readable storage medium storing a vector cache line write back instruction. The vector cache line write back instruction is to indicate a source packed memory indices operand that is to have a plurality of memory indices. The vector cache line write back instruction, if executed by a machine, is to cause the machine to perform operations including causing any dirty cache lines, in any caches in a coherency domain, which store data for any of a plurality of memory addresses that are indicated by any of the memory indices of the source packed memory indices operand, to be written back toward one or more memories.

Example 24 includes article of manufacture of Example 23, in which the vector cache line write back instruction, if executed by the machine, is further to cause the machine to optionally invalidate any cache lines, in said any of the caches in the coherency domain, which are to have stored therein the data for any of the memory addresses.

Example 25 includes article of manufacture of Example 23, in which the vector cache line write back instruction, if executed by the machine, is further to cause the machine to cause states of said any of the dirty cache lines, in said any of the caches in the coherency domain, which are to have stored therein the data for any of the memory addresses, to optionally be changed to an un-modified state.

Example 26 is a processor or other apparatus to perform or operative to perform the method of any one of Examples 14 to 20.

Example 27 is a processor or other apparatus that includes means for performing the method of any one of Examples 14 to 20.

Example 28 is a processor that includes any combination of modules and/or units and/or logic and/or circuitry and/or means for performing the method of any one of Examples 14 to 20.

Example 29 is an article of manufacture that includes an optionally non-transitory machine-readable medium, which optionally stores or otherwise provides an instruction, which if and/or when executed by a processor, computer system, electronic device, or other machine, is operative to cause the machine to perform the method of any one of Examples 14 to 20.

Example 30 is a computer system or other electronic device including a bus or other interconnect, the processor of any one of Examples 1 to 13 coupled with the interconnect, and one or more components coupled with the interconnect that are selected from an optional dynamic random access memory (DRAM), an optional static RAM, an optional flash memory, an optional graphics controller or chip, an optional video card, an optional wireless communications chip, an optional wireless transceiver, an optional Global System for Mobile Communications (GSM) antenna, an optional coprocessor (e.g., a CISC coprocessor), an optional audio device, an optional audio input device, an optional audio output device, an optional video input device (e.g., a video camera), an optional network interface, an optional communication interface, an optional persistent memory (e.g., an optional phase change memory, memristors, etc.), and combinations thereof.

Example 31 is a processor or other apparatus substantially as described herein.

Example 32 is a processor or other apparatus that is operative to perform any method substantially as described herein.

Example 33 is a processor or other apparatus to perform (e.g., configurative or operative or having components to perform) any vector cache line write bac instruction substantially as described herein.

Example 34 is a processor or other apparatus including a decode unit to decode instructions of a first instruction set. The decode unit is to receive one or more instructions of the first instruction set that emulate a vector cache line write back instruction. The vector cache line write back instruction may be any of the instructions substantially as disclosed herein, and is to be of a second instruction set. The processor or other apparatus also includes one or more execution units coupled with the decode unit to execute or perform the one or more instructions of the first instruction set. The one or more execution units, in response to the one or more instructions of the first instruction set, are to have an architectural affect as specified by the vector cache line write back instruction.

Example 35 is a computer system or other electronic device that includes a processor having a decode unit to decode instructions of a first instruction set. The processor also has one or more execution units. The electronic device also includes a storage device coupled with the processor. The storage device is to store a vector cache line write back instruction, which may be any of the vector cache line write back instructions substantially as disclosed herein, and which is to be of a second instruction set. The storage device is also to store instructions to convert the vector cache line write back instruction into one or more instructions of the first instruction set. The one or more instructions of the first instruction set, when performed by the processor, are to cause the processor to have an architectural affect as specified by the vector cache line write back instruction.

Example 36 is a processor that includes a means for receiving a vector cache line write back instruction. The vector cache line write back instruction indicating a source packed memory indices operand having a plurality of memory indices. The processor also includes a means for causing, responsive to the vector cache line write back instruction, any dirty cache lines, in any caches in a coherency domain, which store data for any of a plurality of memory addresses that are indicated by any of the memory indices of the source packed memory indices operand, to be written back toward one or more memories.

What is claimed is:

1. A processor comprising:
    a plurality of packed data registers;
    a decode unit to decode an instruction, the instruction to indicate a source packed data operand that is to include a plurality of memory indices;
    a cache coherency system coupled with the plurality of the packed data registers and coupled with the decode unit, the cache coherency system, in response to the decode of the instruction, to cause all dirty cache lines, in all caches in a coherency domain, which are addressed by memory addresses corresponding to any of the plurality of the memory indices, to be written back toward one or more memories; and
    circuitry, in response to the decode of the instruction, to impose a fence with respect to one or more instructions that follow the instruction in program order.

2. The processor of claim 1, wherein the cache coherency system, in response to the decode of the instruction, is to cause invalidation of said all dirty cache lines.

3. The processor of claim 1, wherein the cache coherency system, in response to the decode of the instruction, is to cause states of said all dirty cache lines to be changed to an un-modified state.

4. The processor of claim 1, further comprising a memory subsystem, in response to the decode of the instruction, to impose the fence to prevent all subsequent store instructions, which are to follow the instruction in program order, from becoming globally visible until all preceding store instructions, which are to precede the instruction, become globally visible.

5. The processor of claim 1, wherein the processor, in response to the decode of the instruction, is to impose the fence to prevent all subsequent instructions, which are to follow the instruction in program order, from completing until said all dirty cache lines have been written back to a persistent storage.

6. The processor of claim 1, further comprising:
    a branch prediction unit to predict branches;
    an instruction prefetch unit coupled with the branch prediction unit, the instruction prefetch unit to prefetch instructions including the instruction;
    a level 1 (L1) instruction cache coupled with the instruction prefetch unit, the L1 instruction cache to store instructions;
    an L1 data cache to store data;
    a level 2 (L2) cache to store data and instructions;
    an instruction fetch unit coupled with the decode unit, the L1 instruction cache, and the L2 cache, to fetch the instruction from one of the L1 instruction cache and the L2 cache, and provide the instruction to the decode unit;
    a register rename unit to rename registers; and
    a scheduler to schedule one or more operations that are to have been decoded from the instruction for execution by the cache coherency system.

7. A processor comprising:
    a plurality of packed data registers;
    a decode unit to decode an instruction, the instruction to indicate a source packed data operand that is to include a plurality of memory indices;
    one or more cache controllers coupled with the decode unit, in response to the decode of the instruction, to initiate write backs toward persistent storage, of all dirty cache lines, in all of one or more internal caches of the processor in a coherency domain, which are addressed by memory addresses corresponding to any of the plurality of the memory indices; and
    circuitry, in response to the decode of the instruction, to prevent subsequent instructions, which are to follow the instruction in program order, from completing until said all dirty cache lines have been written back to the persistent storage.

8. The processor of claim 7, further comprising a bus interface unit coupled with the one or more cache controllers, in response to the decode of the instruction, to transmit one or more cache line write back signals on an interconnect to cause said all dirty cache lines, in one or more caches external to the processor in the coherency domain, which are addressed by the memory indices, to be written back toward the one or more memories.

9. The processor of claim 8, wherein the bus interface unit is to transmit the one or more cache line write back signals on the interconnect to cause said all dirty cache lines, in the one or more caches external to the processor in the coherency domain, which is addressed by a given memory address corresponding to a given memory index, to be written back toward the one or more memories, even when data for the given memory address is not to be stored in said any of the one or more internal caches of the processor.

10. The processor of claim 8, wherein the bus interface unit is to transmit the one or more cache line write back signals on the interconnect to cause said all dirty cache lines, in the one or more caches external to the processor in the coherency domain, which is addressed by a given memory address corresponding to a given memory index, to be written back toward the one or more memories, regardless of states of any cache lines storing data for the given memory address in said any of the one or more internal caches of the processor.

11. A processor comprising:
    a plurality of packed data registers;
    a decode unit to decode an instruction, the instruction to indicate a source packed data operand that is to include a plurality of memory indices, and the instruction to indicate a source packed data operation mask operand that is to include a plurality of mask elements;
    a cache coherency system coupled with the plurality of the packed data registers, and coupled with the decode unit, the cache coherency system, in response to the decode of the instruction, to selectively cause, subject to the source packed data operation mask operand, all dirty cache lines, in all caches in a coherency domain, which are implicated by only all unmasked memory indices of the plurality of the memory indices, to be written back toward one or more memories, wherein said all unmasked memory indices correspond to all unmasked mask elements of the plurality of mask elements; and
    circuitry, in response to the decode of the instruction, to impose a fence with respect to one or more instructions that follow the instruction in program order.

12. The processor of claim 11, wherein the cache coherency system, in response to the decode of the instruction, is to cause states of said all dirty cache lines to be changed to an un-modified state.

13. The processor of claim 11, wherein the cache coherency system, in response to the decode of the instruction, is to cause invalidation of said all dirty cache lines.

14. The processor of claim 11, wherein the processor, in response to the decode of the instruction, is to impose the fence to prevent all subsequent instructions, which are to follow the instruction in program order, from completing until said all dirty cache lines have been written back to a persistent storage.

15. The processor of claim 11, further comprising a memory subsystem, in response to the decode of the instruction, to impose the fence to prevent all subsequent store instructions, which are to follow the instruction in program order, from becoming globally visible until all preceding store instructions, which are to precede the instruction, become globally visible.

16. A processor comprising:
a plurality of packed data registers;
a decode unit to decode an instruction, the instruction to indicate a first source packed data operand that is to include a plurality of memory indices, and the instruction to indicate a second source packed data operand that is to include a plurality of data elements; and
an execution unit coupled with the decode unit, the execution unit, in response to the decode of the instruction, to initiate a store operation of each of the plurality of data elements of the second source packed data operand to a corresponding memory address that is to be indicated by a corresponding memory index of the first source packed data operand;
circuitry, in response to the decode of the instruction, to impose a fence with respect to one or more instructions that follow the instruction in program order; and
a cache coherency system coupled with the decode unit, the cache coherency system, in response to the decode of the instruction, to cause all dirty cache lines, in all caches in a coherency domain, which are addressed by any of the memory addresses that correspond to the memory indices, to be written back toward one or more memories.

17. The processor of claim 16, further comprising a memory subsystem including the circuitry, and wherein the memory subsystem, in response to the decode of the instruction, is to prevent all subsequent store instructions, which are to follow the instruction in the program order, from becoming globally visible until all preceding store instructions, which are to precede the instruction in the program order, become globally visible.

18. The processor of claim 16, wherein the circuitry in response to the decode of the instruction, is to prevent all subsequent instructions, which are to follow the instruction in the program order, from completing until said all dirty cache lines have been written back to a persistent storage.

19. The processor of claim 16, wherein the cache coherency system, in response to the decode of the instruction, is to cause invalidation of said all dirty cache lines.

20. The processor of claim 16, wherein the cache coherency system, in response to the decode of the instruction, is to cause states of said all dirty cache lines to be changed to an un-modified state.

* * * * *